(12) United States Patent
Eom et al.

(10) Patent No.: US 11,300,995 B2
(45) Date of Patent: Apr. 12, 2022

(54) FOLDABLE ELECTRONIC DEVICE FOR DETECTING FOLDING ANGLE AND OPERATING METHOD THEREOF

(71) Applicant: SAMSUNG ELECTRONICS CO., LTD., Suwon-si (KR)

(72) Inventors: Kihun Eom, Suwon-si (KR); Kihoon Kang, Suwon-si (KR); Taekeun Kim, Suwon-si (KR); Sunghun Shin, Suwon-si (KR); Kyeongmun Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 16/903,738

(22) Filed: Jun. 17, 2020

(65) Prior Publication Data

US 2021/0041912 A1 Feb. 11, 2021

(30) Foreign Application Priority Data

Aug. 6, 2019 (KR) .................. 10-2019-0095680

(51) Int. Cl.
*G06F 1/16* (2006.01)
*H04M 1/02* (2006.01)

(52) U.S. Cl.
CPC .......... *G06F 1/1616* (2013.01); *G06F 1/1681* (2013.01); *G06F 1/1684* (2013.01);
(Continued)

(58) Field of Classification Search
CPC combination set(s) only.
See application file for complete search history.

(56) References Cited

U.S. PATENT DOCUMENTS 8,405,978 B2 * 3/2013 Okutsu ................. G06F 1/1616
361/679.55
9,286,024 B2 * 3/2016 Becze ....................... G06T 3/40
(Continued)

FOREIGN PATENT DOCUMENTS

EP 2757439 7/2014
JP 5577990 8/2014
(Continued)

OTHER PUBLICATIONS

International Search Report dated Aug. 26, 2020 in corresponding International Application No. PCT/KR2020/006972.
(Continued)

*Primary Examiner* — Lisa Lea-Edmonds
(74) *Attorney, Agent, or Firm* — Nixon & Vanderhye, P.C.

(57) ABSTRACT

Various embodiments provide a device and method for detecting a folding angle of an electronic device. The electronic device includes: a first housing structure connected to a hinge structure; a second housing structure folded about the hinge structure relative to the first housing structure; a first motion sensor module disposed in the first housing structure; a second motion sensor module disposed in the second housing structure; a magnetic force sensor module disposed in the first housing structure; a magnetic body disposed in the second housing structure; and at least one processor. The at least one processor is configured to: identify a folded first angle between the first housing structure and the second housing structure based on the first motion sensor module and the second motion sensor module, and a first index associated with a state of the first angle, identify a folded second angle between the first housing structure and the second housing structure based on the magnetic force sensor module, and a second index associated to a state of the second angle, and determine the folded (Continued)

angle between the first housing structure and the second housing structure based on at least one of the first angle or the second angle selected based on the first index and the second index.

20 Claims, 17 Drawing Sheets

(52) U.S. Cl.
CPC ....... *H04M 1/0216* (2013.01); *H04M 1/0266* (2013.01); *H04M 2250/12* (2013.01)

(56) References Cited

U.S. PATENT DOCUMENTS

| | | | | |
|---|---|---|---|---|
| 9,476,704 | B2* | 10/2016 | Choi | G06F 1/1643 |
| 10,393,516 | B2* | 8/2019 | Choi | G06F 1/1677 |
| 10,534,534 | B2* | 1/2020 | Cheong | G06F 3/0481 |
| 11,015,925 | B2* | 5/2021 | Choi | G06F 1/1677 |
| 11,132,020 | B2* | 9/2021 | Kim | G06F 3/046 |
| 2013/0274926 | A1* | 10/2013 | Tomimori | H04M 1/0214 |
| | | | | 700/275 |
| 2014/0202014 | A1* | 7/2014 | Choi | G06F 1/1694 |
| | | | | 33/303 |
| 2015/0378557 | A1* | 12/2015 | Jeong | H04M 1/0214 |
| | | | | 715/835 |
| 2017/0075640 | A1* | 3/2017 | Chun | G06F 1/1683 |
| 2017/0131118 | A1* | 5/2017 | Kauhaniemi | G01D 5/145 |
| 2018/0039408 | A1* | 2/2018 | Cheong | G06F 1/1677 |
| 2020/0218353 | A1* | 7/2020 | Song | G06F 1/1677 |
| 2021/0278208 | A1* | 9/2021 | Choi | G06F 1/1694 |

FOREIGN PATENT DOCUMENTS

| | | |
|---|---|---|
| KR | 10-2017-0031525 | 3/2017 |
| WO | 2017/079361 | 5/2017 |

OTHER PUBLICATIONS

S. Chen et al., 'Folding state recognition for multi-foldable mobile devices', In: SoutheastCon 2017, Charlotte, NC, 2017, pp. 1-2 [Retrieved on May 8, 2020]. Retrieved from <https://ieeexplore.ieee.org/abstract/document/7925368, pp. 1-2; and figures 3, 5.

* cited by examiner

FOLDABLE ELECTRONIC DEVICE FOR DETECTING FOLDING ANGLE AND OPERATING METHOD THEREOF

CROSS-REFERENCE TO RELATED APPLICATION

This application is based on and claims priority under 35 U.S.C. § 119 to Korean Patent Application No. 10-2019-0095680, filed on Aug. 6, 2019, in the Korean Intellectual Property Office, the disclosure of which is incorporated by reference herein in its entirety.

BACKGROUND

1) Field

The disclosure relates to a foldable electronic device for detecting a folding angle and an operating method thereof.

2) Description of Related Art

Electronic devices have gradually slimmed, and have been improved to reinforce a design aspect and differentiate functional elements. The electronic devices are gradually changed in various shapes away from a uniform shape such as a rectangular shape. For example, the electronic devices can be a deformable structure in which a size of a display can be adjusted to satisfy portability and usability thereof. The electronic devices having the deformable structure can include a foldable electronic device operated in such a way that at least two housings are folded or unfolded with respect to each other.

A foldable electronic device may include a hinge structure, and first and second housing structures that are connected via the hinge structure in directions opposite to each other. The foldable electronic device may be operated in an in-folding and/or out-folding mode in such a manner that the first and second housing structures are rotated about the hinge structure within a range of 0 to 360 degrees. The foldable electronic device may include a display disposed across the first and second housing structures in a state in which the first and second housing structures open to each other at an angle of 180 degrees.

The display of the foldable electronic device may be folded about the hinge structure along with the housing structures. That is, the display may be transformed in various shapes according to a change in structure of the foldable electronic device. The foldable electronic device may change a user interface (e.g., a display mode of content) using various shapes of the display. The foldable electronic device requires a method for detecting a folding angle of the display in order to provide the user interface corresponding to the shape of the display.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a device and method for detecting a folding angle of a display in an electronic device.

According to various example embodiments, an electronic device includes: a foldable housing including a hinge, a first housing connected to the hinge, and a second housing connected to the hinge, and configured to be foldable about the hinge relative to the first housing, a first motion sensor disposed in at least a part of the first housing; a second motion sensor disposed in at least a part of the second housing; a magnetic force sensor disposed at at least a part of the first housing; a magnetic body disposed at at least a part of the second housing; and at least one processor operably connected to the first motion sensor, the second motion sensor, and the magnetic force sensor. The at least one processor is configured to: identify a folded first angle between the first housing structure and the second housing structure based on the first motion sensor and the second motion sensor, and a first index associated with a state of the first angle, identify a folded second angle between the first housing and the second housing based on the magnetic force sensor, and a second index associated with a state of the second angle, and determine the folded angle between the first housing and the second housing based on at least one of the first angle or the second angle based on the first index and the second index.

According to various example embodiments, a method of operating an electronic device includes: identifying a folded first angle between a first housing and a second housing and a first index associated with a state of the first angle based on a first motion sensor, disposed in at least a part of the first housing connected to a hinge, and a second motion sensor disposed in at least a part of the second housing connected to the hinge, and is configured to be foldable about hinge relative to the first housing; identifying a folded second angle between the first housing and the second housing and a second index associated with a state of the second angle based on a magnetic force sensor disposed in the first housing structure; and determining the folded angle between the first housing structure and the second housing structure based on at least one of the first angle or the second angle selected based on the first index and the second index.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings.

Figure 1:
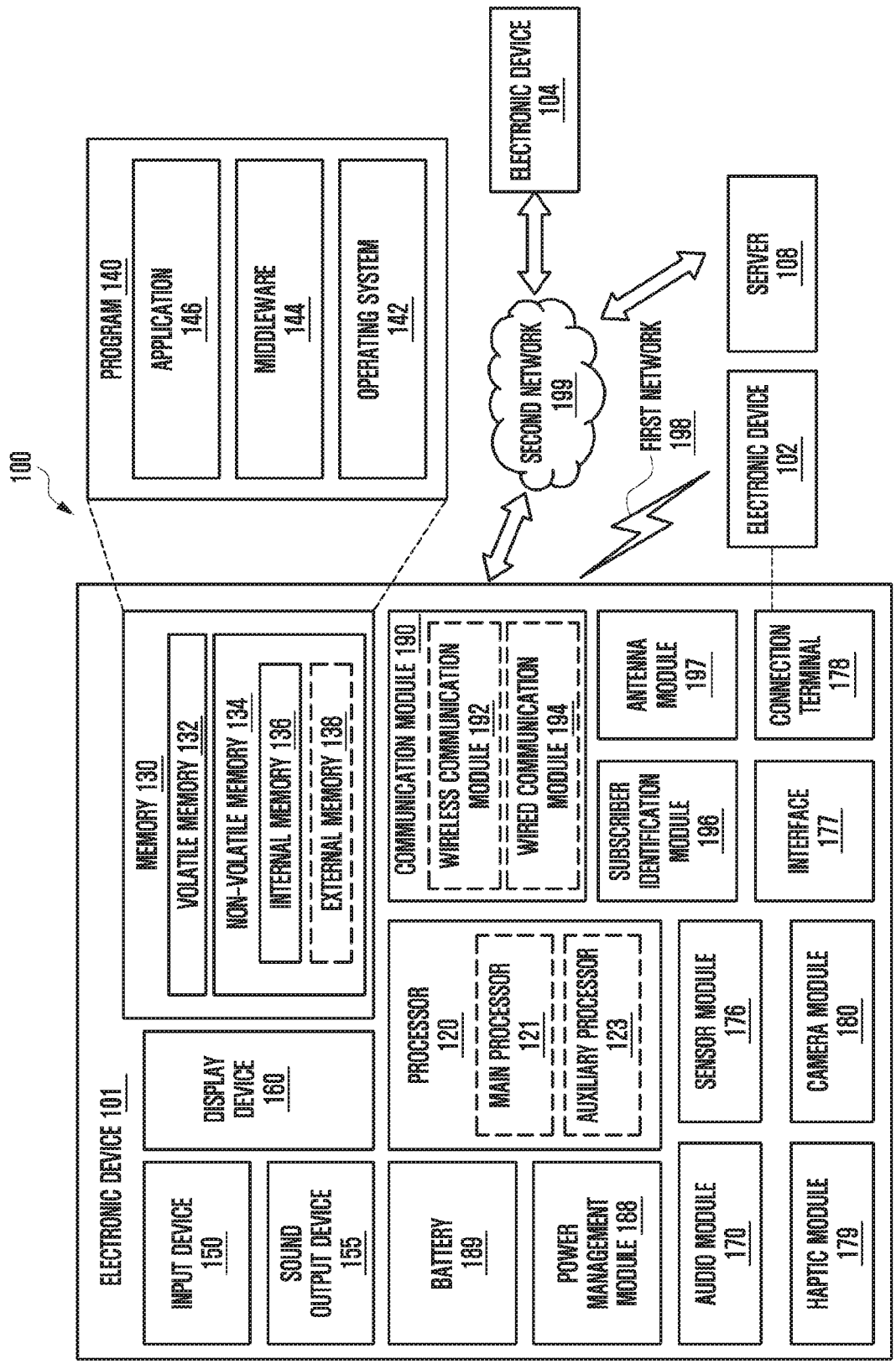
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term may not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
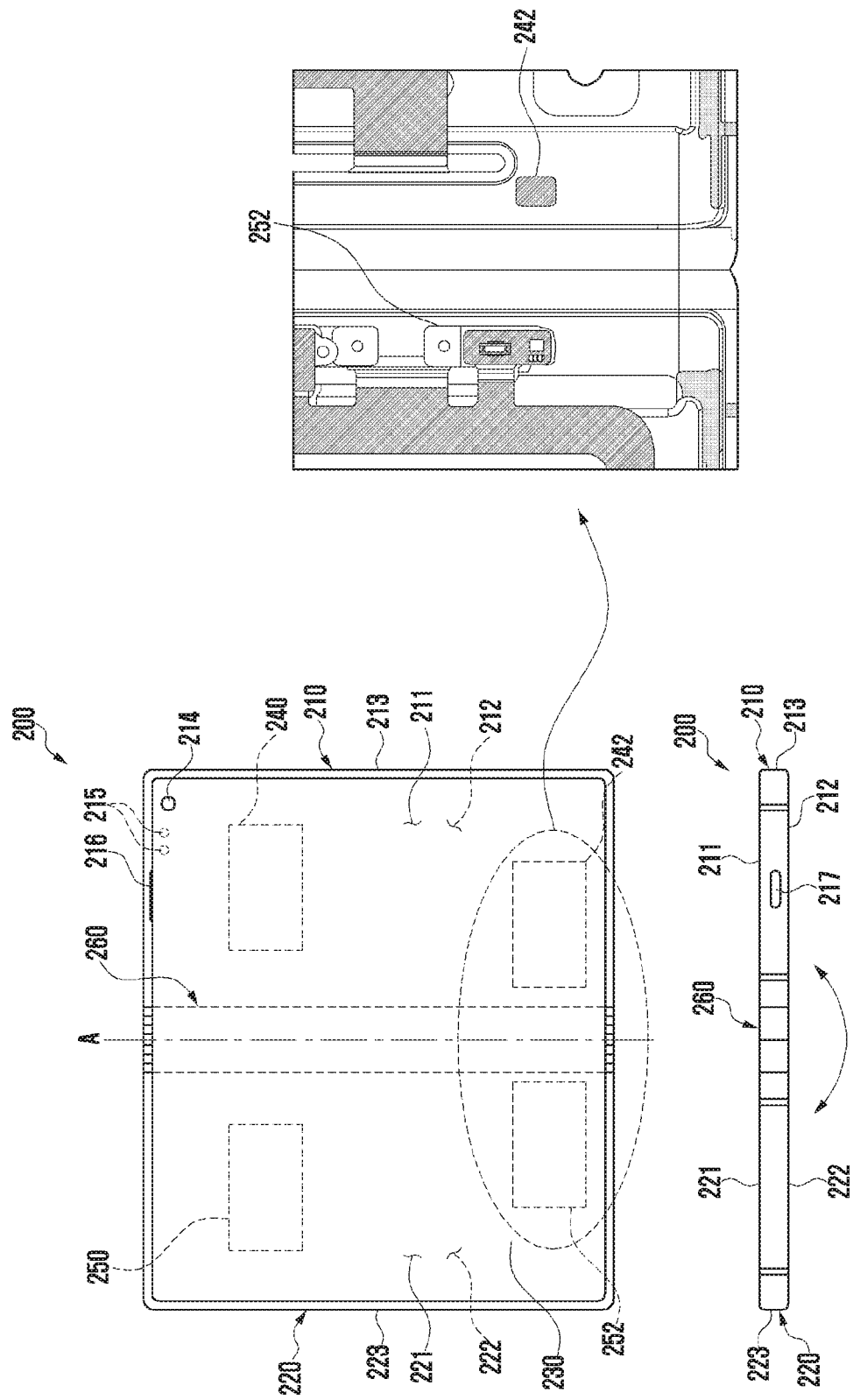
FIG. 2A is a diagram illustrating an example unfolded state of the electronic device based on a first folding direction according to various embodiments.
Figure 2B:
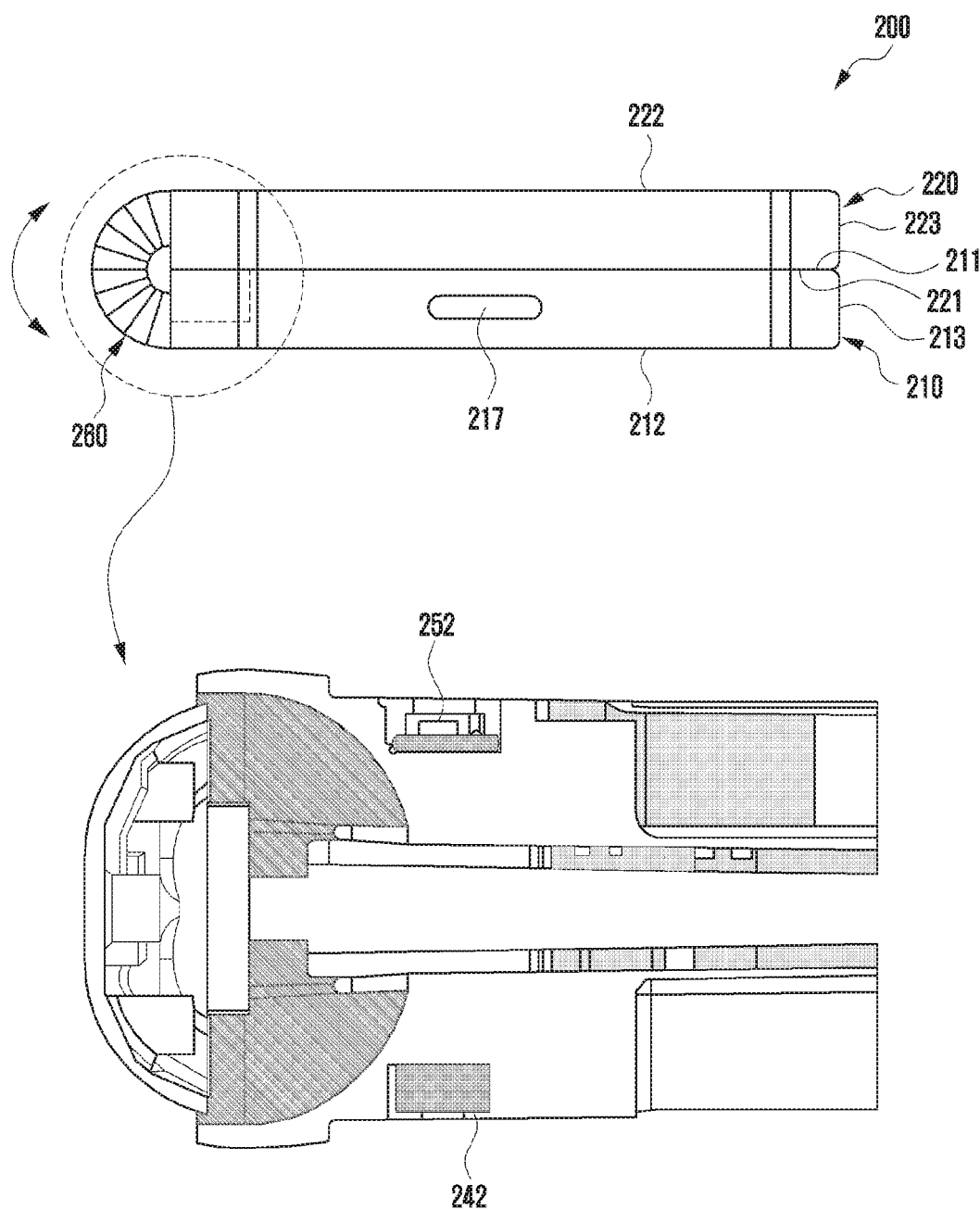
FIG. 2B is a diagram illustrating an example folded state of the electronic device based on the first folding direction according to various embodiments.

FIG. 2A is a diagram illustrating an example unfolded state of an example electronic device based on a first folding direction according to various embodiments. FIG. 2B is a diagram illustrating an example folded state of an example electronic device based on the first folding direction according to various embodiments. An electronic device 200 of FIGS. 2A and 2B is at least partly similar to the electronic device 101 of FIG. 1, and may include other embodiments of the electronic device.

Referring to FIG. 2A, the electronic device 200 may include a pair of housing structures 210 and 220 (e.g., foldable housing structures) that are coupled through a hinge structure 260 (e.g., hinge) to be rotatable based on a folding axis A (e.g., a longitudinal folding axis) to be folded with respect to each other, and a display 230 (e.g., a flexible display or a foldable display) that is disposed in a space defined by the pair of housing structures 210 and 220. Herein, a surface on which the display 230 is disposed may be defined as a front surface of the electronic device 200, and a surface opposite to the front surface may be defined as a rear surface of the electronic device 200. Further, a surface surrounding a space between the front surface and the rear surface may be defined as a lateral surface of the electronic device 200.

According to various embodiments, the pair of housing structures 210 and 220 may include a first housing structure 210 (e.g., first housing) and a second housing structure 220 (e.g., second housing). The pair of housing structures 210 and 220 of the electronic device 200 are not limited to shapes and coupling illustrated in FIGS. 2A and 2B, and may be implemented in other shapes or by a combination and/or coupling of components.

According to various embodiments, the first housing structure 210 and the second housing structure 220 may be disposed on both sides based on the folding axis (the axis A), and have a shape that is symmetric with respect to the folding axis (the axis A) on the whole. According to an embodiment, an angle or a distance formed by the first housing structure 210 and the second housing structure 220 may be changed depending on whether a state of the electronic device 200 is an unfolded state, a folded state, or an intermediate state. According to an embodiment, unlike the first housing structure 210, the second housing structure 220 further includes a region in which a camera 214 and various sensors 215 are disposed, but it may have a symmetric shape in the other region. As another embodiment, the region in which a camera 214 and various sensors 215 are disposed may be additionally disposed or replaced in at least a partial region of the second housing structure 220.

According to various embodiments, the first housing structure 210 may be connected to the hinge structure 260 in the unfolded state of the electronic device 200, and may include a first surface 211 that is disposed to face the front surface of the electronic device 200, a second surface 212 that faces a direction opposite to the first surface 211, and a first lateral member 213 that surrounds at least a part of a space between the first surface 211 and the second surface 212.

According to various embodiments, the second housing structure 220 may be connected to the hinge structure 260 in the unfolded state of the electronic device 200, and may include a third surface 221 that is disposed to face the front surface of the electronic device 200, a fourth surface 222 that faces a direction opposite to the third surface 221, and a second lateral member 223 that surrounds at least a part of a space between the third surface 221 and the fourth surface 222. In an embodiment, the first surface 211 may be disposed to face the third surface 221 in the unfolded state in an in-folding mode as in FIG. 2B. In another embodiment, the second surface 212 may be disposed to face the fourth surface 222 in the unfolded state in an out-folding mode.

According to various embodiments, the electronic device 200 may include a recess provided to house the display 230 by structural coupling of the first housing structure 210 and the second housing structure 220. The recess may have substantially the same size as the display 230.

According to various embodiments, the camera 214 and the sensors 215 may be disposed in a certain region of one corner of the first housing structure 210. However, the disposition of the camera 214 and the sensors 215 is not limited to the illustrated example. In another embodiment, the camera 214 and the sensors 215 may be disposed in at least a partial region of the second housing structure 220. In another embodiment, the camera 214 and the sensors 215 may be disposed in at least a partial region of the first housing structure 210 and in at least a partial region of the second housing structure 220.

According to various embodiments, the camera 214 may be exposed to the front surface of the electronic device 200 through an opening provided in one corner of the first housing structure 210. The sensors 215 may be disposed at a lower end of at least a partial region of the display 230. As an example, the sensors 215 may include at least one of a proximity sensor, an illuminance sensor, an iris recognition sensor, an ultrasonic sensor, or an indicator. In another embodiment, the sensors 215 may be exposed to the front surface of the electronic device 200 through openings provided in one corner of the first housing structure 210.

According to various embodiments, the first housing structure 210 may include a receiver 216 and an interface connector port 217 that are disposed in at least a partial region thereof. In an embodiment, although not illustrated, the electronic device 200 may include an ear jack hole, an external speaker module, a SIM card tray, or at least one key button that is disposed through the first housing structure 210 and/or the second housing structure 220.

According to various embodiments, the first housing structure 210 and the second housing structure 220 may provide a space in which various components (e.g., a printed circuit board, an antenna module, a sensor module, or a battery) of the electronic device 200 may be disposed through a structure coupled to each other. In an embodiment, one or more components may be disposed or visually exposed on the rear surface of the electronic device 200. As an example, one or more components or sensors may be visually exposed through the rear surface 222 of the second housing structure 220. The sensors may include a proximity sensor, a rear camera unit and/or a flash. As an example, at least a part of a sub-display may be visually exposed through the rear surface 222 of the second housing structure 220.

According to various embodiments, the display 230 may be disposed in the space defined by the pair of housing structures 210 and 220. According to an embodiment, the display 230 may be seated in a recess defined by the pair of housing structures 210 and 220, and be disposed to occupy substantially most of the front surface of the electronic device 200. Thus, the front surface of the electronic device 200 may include the display 230, and a partial region (e.g., an edge region) of the first housing structure 210 and a partial region (e.g., an edge region) of the second housing structure 220 that are adjacent to the display 230.

According to various embodiments, in a case where the electronic device 200 is in an unfolded state (e.g., a state of FIG. 2A), the first housing structure 210 and the second housing structure 220 may be disposed at an angle of 180 degrees, and the first surface 211 and the third surface 221 may be disposed to face the same direction. Further, the first surface 211 may form the same plane as the third surface 221.

According to various embodiments, in a case where the electronic device 200 is in a folded state (e.g., a state of FIG. 2B), the first housing structure 210 and the second housing structure 220 may be disposed to face each other. For example, the first surface 211 of the first housing structure 210 and the third surface 221 of the second housing structure 220 may be disposed at a small angle (e.g., between 0 degree and 10 degrees), and may face each other.

According to various embodiments, in a case where the electronic device 200 is in an intermediate state, the first housing structure 210 and the second housing structure 220 may be disposed at a certain angle. For example, the first surface 211 of the first housing structure 210 and the third surface 221 of the second housing structure 220 may be disposed at an angle that is larger than in the folded state and is smaller than in the unfolded state.

According to various embodiments, the electronic device 200 may include a first motion sensor module 240 and a magnetic body (e.g., a magnet) 242 that are disposed at at least a part of the first housing structure 210. According to an embodiment, the first motion sensor module 240 may be configured by a combination of at least two of an acceleration sensor, an angular velocity sensor (e.g., a gyro sensor), or a geomagnetic sensor. As an example, the first motion sensor module 240 may detect an angular velocity change and/or an acceleration change associated with a motion of the first housing structure 210. According to an embodiment, the magnetic body 242 may be disposed at at least a part of the first housing structure 210 adjacent to the hinge structure 260.

According to various embodiments, the electronic device 200 may include a second motion sensor module 250 and a magnetic force sensor module 252 that are disposed at at least a part of the second housing structure 220. According to an embodiment, the second motion sensor module 250 may be configured by a combination of at least two of an acceleration sensor, an angular velocity sensor (e.g., a gyro sensor), or a geomagnetic sensor. As an example, the second motion sensor module 250 may detect an angular velocity change and/or an acceleration change associated with a motion of the second housing structure 220. According to an embodiment, the magnetic force sensor module 252 may be disposed at at least a part of the second housing structure 220 adjacent to the hinge structure 260. The magnetic force sensor module 252 may detect a magnetic force generated from the magnetic body 240 disposed in the first housing structure 210.

According to various embodiments, the magnetic body 242 of the first housing structure 210 and the magnetic force sensor module 252 of the second housing structure 220 may be disposed to at least partly face each other when the electronic device 200 is in the folded state. In other words, the magnetic body 242 of the first housing structure 210 may be disposed such that at least a part thereof overlaps the magnetic force sensor module 252 of the second housing structure 220 when the electronic device 200 is in the folded state (e.g., the in-folding mode) as in FIG. 2B when viewed in a direction from the second surface 212 to the fourth surface 222.

Figure 3A:
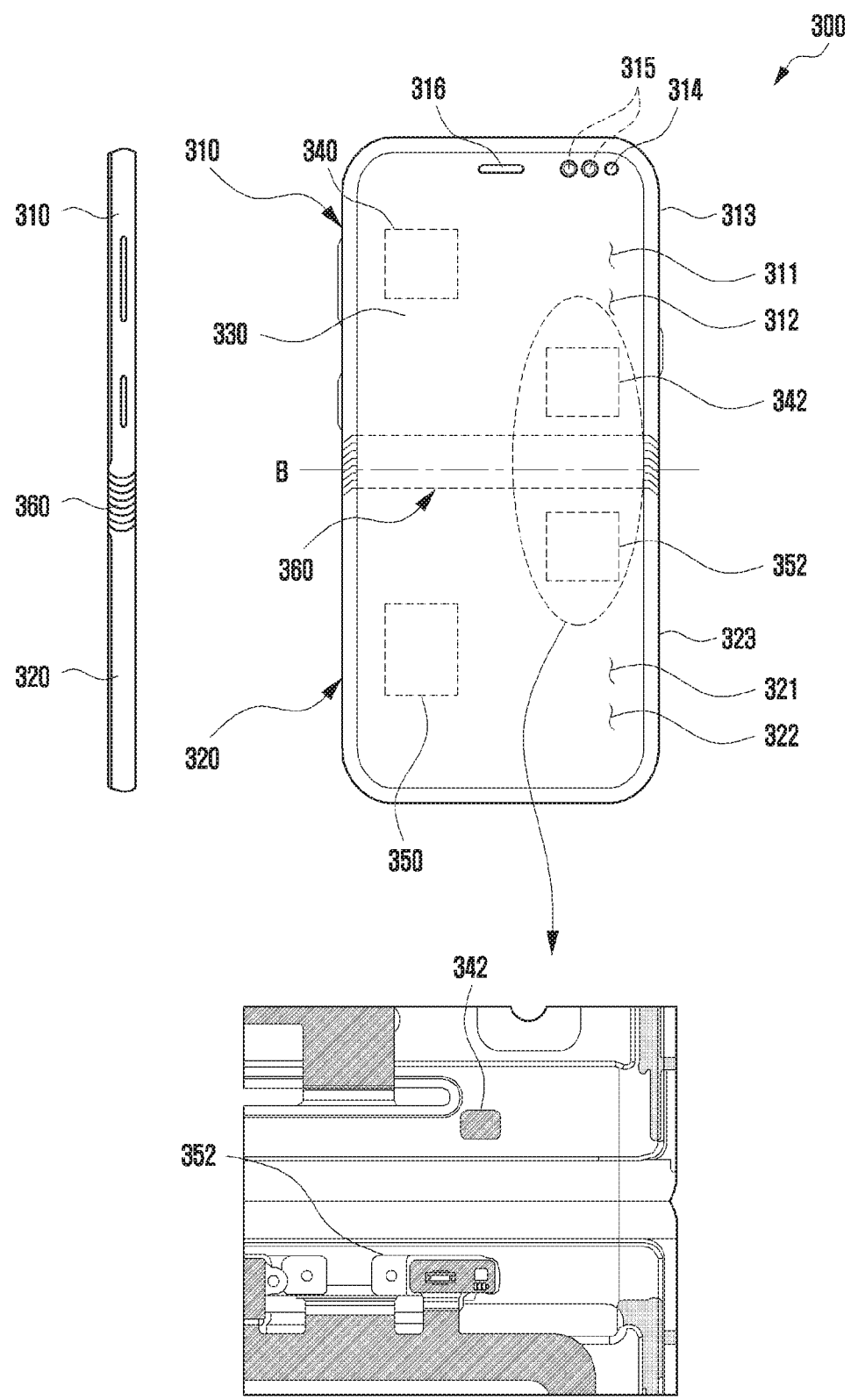
FIG. 3A is a diagram illustrating an example unfolded state of the electronic device based on a second folding direction according to various embodiments.
Figure 3B:
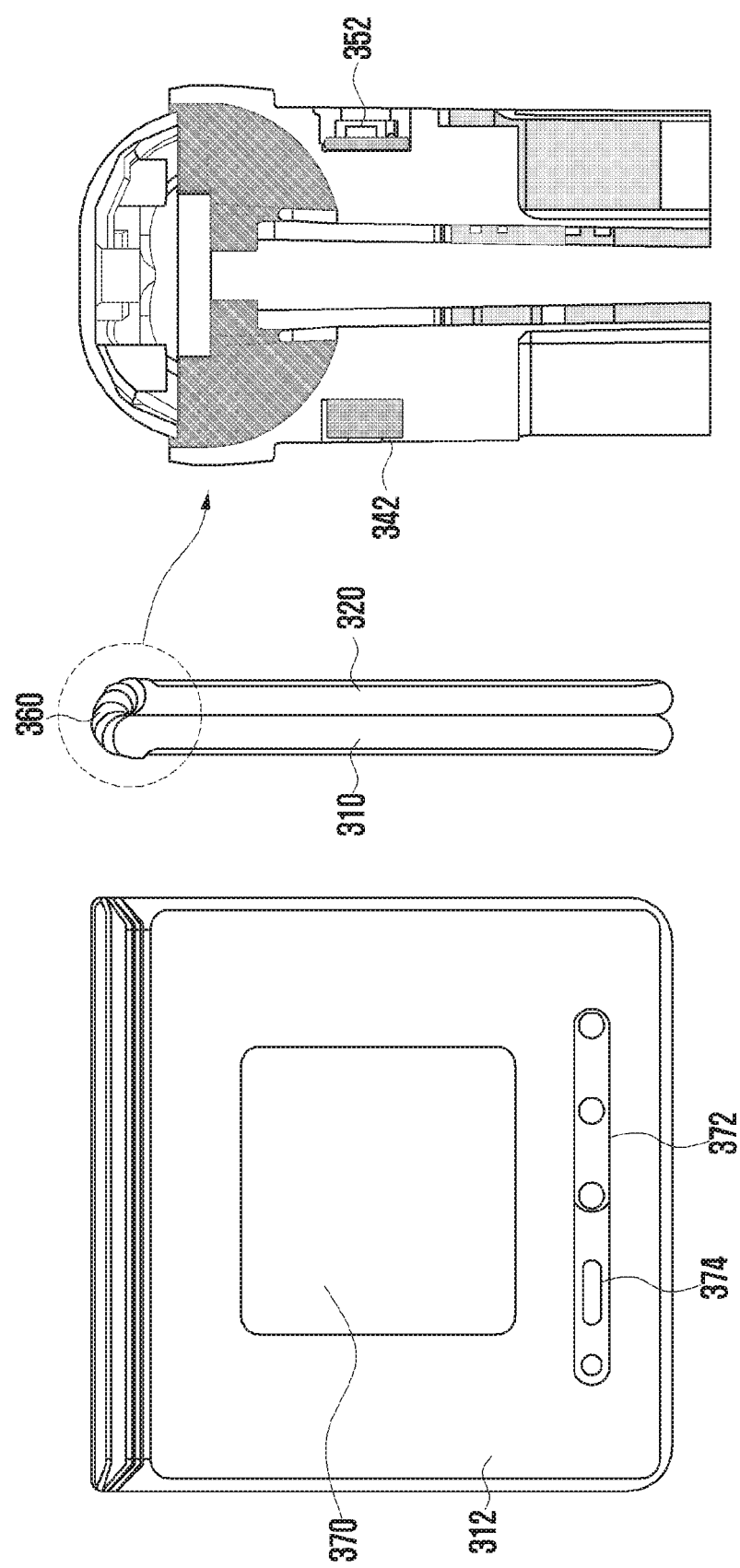
FIG. 3B is a diagram illustrating an example folded state of the electronic device based on the second folding direction according to various embodiments.

FIG. 3A is a diagram illustrating an example unfolded state of an example electronic device based on a second folding direction according to various embodiments. FIG. 3B is a diagram illustrating an example folded state of an example electronic device based on the second folding direction according to various embodiments. An electronic device 300 of FIGS. 3A and 3B is at least partly similar to the electronic device 101 of FIG. 1, and may include the other embodiments of the electronic device.

Referring to FIG. 3A, the electronic device 300 may include a pair of housing structures 310 and 320 (e.g., foldable housing structures) that are coupled through a hinge structure 360 (e.g., hinge) to be rotatable based on a folding axis B to be folded with respect to each other, and a display 330 (e.g., a flexible display or a foldable display) that is disposed in a space defined by the pair of housing structures 310 and 320. In the following description, in comparison with the electronic device 200, the electronic device 300 that is in an unfolded state as in FIG. 3A may be different only in a shape of the display 330 due to a folding axis having a different direction, and be the same in an operation of each component. According to an embodiment, when the electronic device 200 of FIG. 2A is in the unfolded state, the display 230 may be configured in a first shape. As an example, the first shape may have a first screen ratio (e.g., 4:3). According to an embodiment, when the electronic device 300 of FIG. 3A in the unfolded state, the display 330 may be configured in a second shape different from the first shape. As an example, the second shape may have a second screen ratio (e.g., 16:9) different from the first screen ratio (e.g., 4:3).

According to various embodiments, the first housing structure 310 (e.g., first housing) and the second housing structure 320 (e.g., second housing) may be disposed on both sides based on the folding axis B. According to an embodiment, unlike the second housing structure 320, the first housing structure 310 includes a region in which a camera 314 and various sensors 315 are disposed, but it may have a symmetric shape in the other region. As another embodiment, the region in which the camera 314 and the various sensors 315 are disposed may be additionally disposed or replaced in at least a partial region of the second housing structure 320. As another example, the camera 314 or at least some of the various sensors 315 may be disposed in at least a partial region of the first housing structure 310, and the others may be disposed in at least a partial region of the second housing structure 320.

According to various embodiments, the first housing structure 310 may include a first surface 311 that is disposed to face a front surface of the electronic device 300, a second surface 312 that faces a direction opposite to the first surface 311, and a first lateral member 313 that surrounds at least a part of a space between the first surface 311 and the second surface 312 in the unfolded state of the electronic device 300.

According to various embodiments, the second housing structure 320 may include a third surface 321 that is disposed to face the front surface of the electronic device 300, a fourth surface 322 that faces a direction opposite to the third surface 321, and a second lateral member 323 that surrounds at least a part of a space between the third surface 321 and the fourth surface 322 in the unfolded state of the electronic device 300.

According to various embodiments, the camera 314 may be exposed to the front surface of the electronic device 300 through an opening provided in one corner of the first housing structure 310. The sensors 315 may include at least one of a proximity sensor, an illuminance sensor, an iris recognition sensor, an ultrasonic sensor, or an indicator. As an example, the sensors 315 may be exposed to the front surface of the electronic device 300 through openings provided in one corner of the first housing structure 310, or be disposed at a lower end of at least a partial region of the display 330.

According to various embodiments, the first housing structure 310 may include a receiver 316 that is disposed in at least a partial region thereof. In an embodiment, although not illustrated, the electronic device 300 may include an ear jack hole, an external speaker module, a SIM card tray, an interface connector port, or at least one key button that is disposed through the first housing structure 310 and/or the second housing structure 320.

According to various embodiments, at least one or more components may be disposed or visually exposed to a rear surface of the electronic device 300. According to an embodiment, at least one or more components or sensors may be visually exposed to the rear surface (the second surface 312) of the first housing structure 310. The sensors may include a rear camera unit 372 and/or a proximity sensor 374. According to an embodiment, at least a part of a sub-display 370 may be visually exposed to the second surface 312 of the first housing structure 310.

According to various embodiments, an angle or a distance formed by the first housing structure 310 and the second housing structure 320 may be changed depending on whether a state of the electronic device 300 is an unfolded state (e.g., a state of FIG. 3A), a folded state (e.g., a state of FIG. 3B), or an intermediate state.

According to various embodiments, the electronic device 300 may include a first motion sensor module 340 and a magnetic body (e.g., a magnet) 342 that are disposed at at least a part of the first housing structure 310. According to an embodiment, the first motion sensor module 340 may be configured by a combination of at least two of an acceleration sensor, an angular velocity sensor (e.g., a gyro sensor), or a geomagnetic sensor. As an example, the electronic device 300 may detect a pose (e.g., an orientation) and gesture of the first housing structure 310 through the first motion sensor module 340, To be specific, the pose of the first housing structure 310 may be detected based on the acceleration sensor of the first motion sensor module 340, and the gesture of the first housing structure 310 may be detected based on the angular velocity sensor of the first motion sensor module 340. According to an embodiment, the magnetic body 342 may be disposed at at least a part of the first housing structure 310 adjacent to a hinge structure 360.

According to various embodiments, the electronic device 300 may include a second motion sensor module 350 and a magnetic force sensor module 352 that are disposed at at least a part of the second housing structure 320. According to an embodiment, the second motion sensor module 350 may be configured by a combination of at least two of an acceleration sensor, an angular velocity sensor (e.g., a gyro sensor), or a geomagnetic sensor. As an example, the electronic device 300 may detect a pose of the second housing structure 320 through the acceleration sensor of the second motion sensor module 350, and a gesture of the second housing structure 320 through the angular velocity sensor of the second motion sensor module 350. According to an embodiment, the magnetic force sensor module 352 may be disposed at at least a part of the second housing structure 320 adjacent to the hinge structure 360. As an example, the magnetic body 342 of the first housing structure 310 and the magnetic force sensor module 352 of the second housing structure 320 may be disposed to at least partly face each other when the electronic device 300 is in the folded state as in FIG. 3B.

Figure 4A:
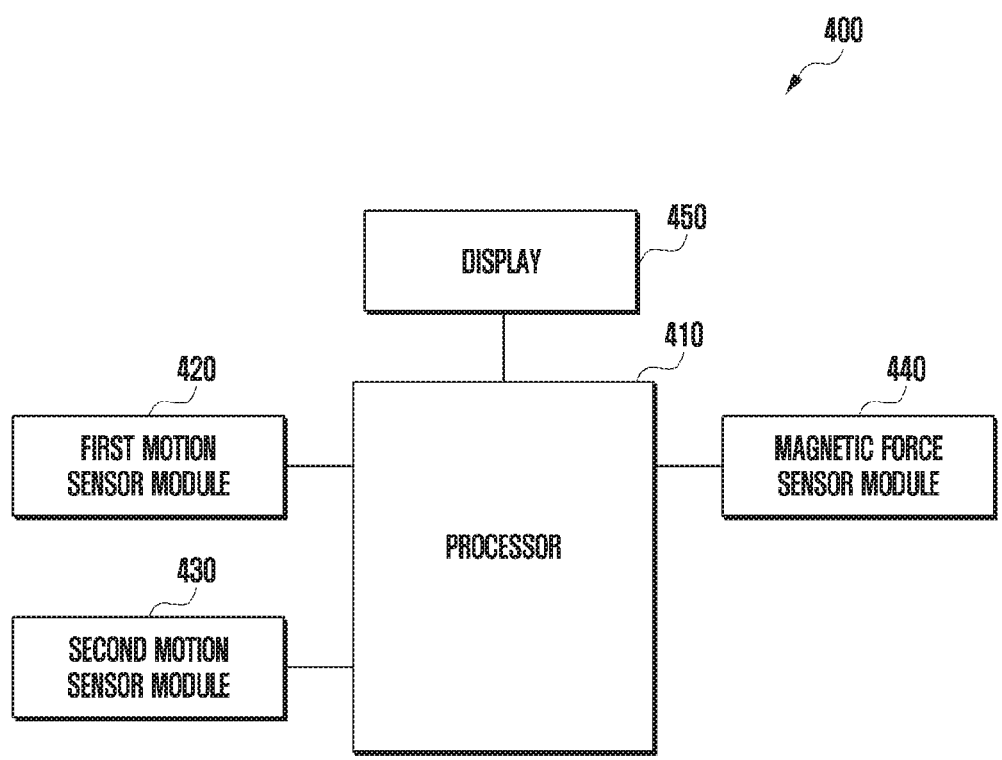
FIG. 4A is a block diagram illustrating an example configuration of an example electronic device for detecting a folding angle of a display according to various embodiments.
Figure 4B:
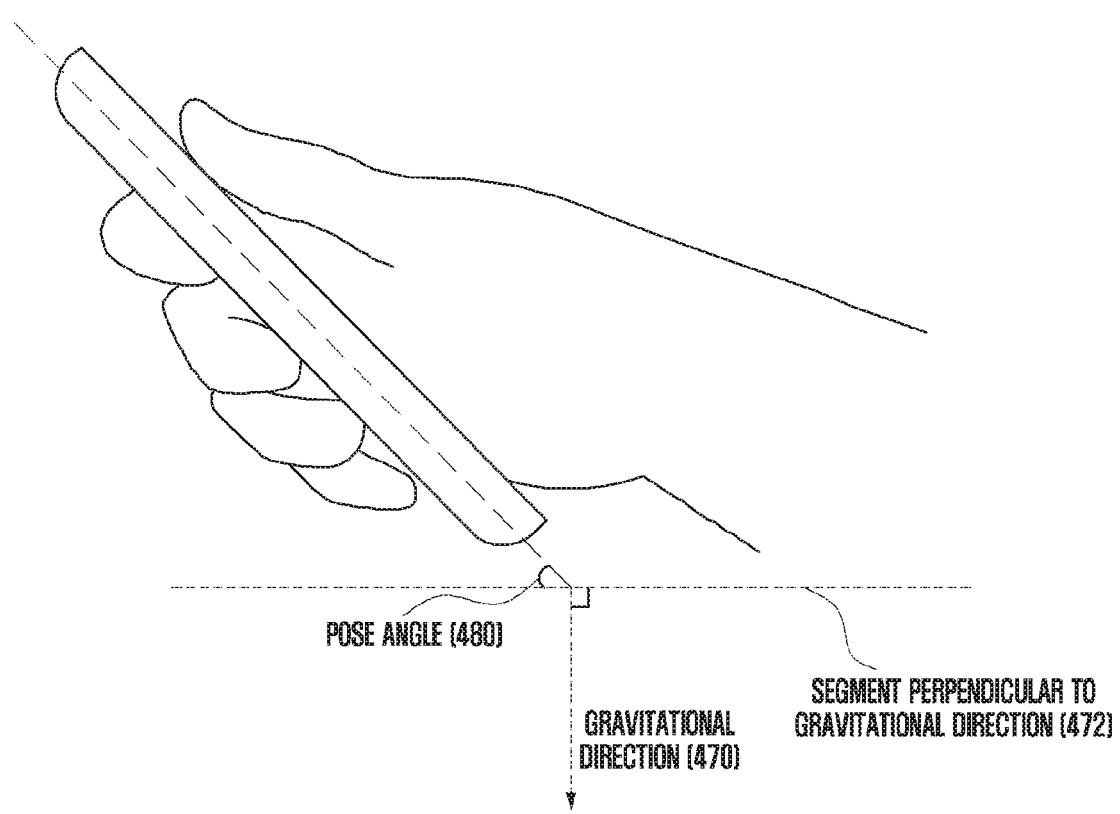
FIG. 4B is a diagram illustrating an example pose angle of the electronic device according to various embodiments.

FIG. 4A is a block diagram 400 illustrating an example configuration of the electronic device 101 for detecting a folding angle of a display according to various embodiments. FIG. 4B is a diagram illustrating an example pose angle of the electronic device according to various embodiments.

Referring to FIG. 4A, the electronic device 101 may include a processor (e.g., including processing circuitry) 410, a first motion sensor module (e.g., including a first motion sensor) 420, a second motion sensor module (e.g., including a second motion sensor) 430, a magnetic force sensor module (e.g., including a magnetic force sensor) 440, and/or a display 450. According to an embodiment, the processor 410 may be the same as or similar to the main processor 121 of FIG. 1, or be included in the main processor 121 of FIG. 1. The first motion sensor module 420, the second motion sensor module 430, and the magnetic force sensor module 440 may be included in the sensor module 176 of FIG. 1. The display 450 may be the same as or similar to the display device 160 of FIG. 1, or be included in the display device 160 of FIG. 1.

According to various embodiments, the processor 410 may include various processing circuitry and identify a first angle associated with the display 450 and/or an index associated with a state of the first angle using the first motion sensor module 420 and/or the second motion sensor module 430. As an example, the first angle may include a folding angle of the display 450 which is estimated using the motion sensor modules 420 and 430 only. As an example, the state of the first angle may include accuracy of the first angle.

According to an embodiment, the processor 410 may produce (e.g., calculate) a first angle associated with the folding angle of the display 450 based on angular velocity data and/or acceleration data that are associated with a first housing structure (e.g., the first housing structure 210 of FIG. 2A) and a second housing structure (e.g., the second housing structure 220 of FIG. 2A) and are obtained through the first motion sensor module 420 and/or the second motion sensor module 430. As an example, the processor 410 may integrate changed angular velocity data of the first housing structure which is obtained through the first motion sensor module 420, and detect a changed angle of the first housing structure. The processor 410 may correct an error of the detected angle based on the angular velocity data using the acceleration data of the first housing structure which is obtained through the first motion sensor module 420. As an example, the processor 410 may integrate changed angular velocity data of the second housing structure which is obtained through the second motion sensor module 430, and detect a changed angle of the second housing structure. The processor 410 may correct an error of the detected angle based on the angular velocity data using the acceleration data of the second housing structure which is obtained through the second motion sensor module 430. As an example, the first angle associated with the folding angle of the display 450 may be detected based on the corrected angle of the first housing structure and the corrected angle of the second housing structure. As an example, the processor 410 may calculate an angle using an acceleration sensor based on Math. 1 below.

$$\theta = \tan^{-1}\frac{y}{z}$$ [Math. 1]

Here, θ is an angle calculated based on the acceleration data, y is a y-axis output value obtained through the acceleration sensor, and z is a z-axis output value obtained through the acceleration sensor.

According to an embodiment, the processor 410 may determine the state of the first angle associated with the folding angle of the display 450 based on at least one of gesture information of the electronic device 101, an orientation (e.g., a horizontal or vertical orientation) of the electronic device 101, or a pose angle of the electronic device 101. As an example, the gesture information of the electronic device 101 may be determined based on a variance value of raw data obtained through the motion sensor modules 420 and 430. As an example, the orientation of the electronic device 101 may represent an orientation in which the electronic device 101 is gripped by a user or is held on a holder. In the following description, the orientation of the electronic device 101 may be determined to be a vertical orientation if an orientation of a relatively long axis in the electronic device 101 configured in a rectangular shape is parallel to the gravitational direction, and to be a horizontal orientation if the orientation of the relatively long axis is perpendicular to the gravitational direction. As an example, the pose angle of the electronic device 101 may include an angle of the electronic device 101 which is measured based on the gravitational direction 470 in the state in which the electronic device 101 is gripped by a user or is held on a holder. As an example, as illustrated in FIG. 4B, the pose angle 480 of the electronic device 101 may be measured based on a segment 472 (e.g., a horizontal line) perpendicular to the gravitational direction 470. As another example, the pose angle 480 of the electronic device 101 may be measured based on the gravitational direction 470 (e.g., a vertical line). As an example, the state (accuracy) of the first angle may be defined as in Table 1 below. For example, Table 1 may include the pose angle 480 of the electronic device 101 (e.g., about ±70 degrees, about ±50 degrees, or about ±10 degrees of Table 1) which is measured based on the segment 472 perpendicular to the gravitational direction 470. However, the pose angle of the electronic device 101 (e.g., about ±70 degrees, about ±50 degrees, or about ±10 degrees of Table 1) which is used to define the state of the first angle may be differently defined according to a reference for measuring the pose angle of the electronic device 101. For example, if the pose angle of the electronic device 101 is measured based on the gravitational direction 470, the index 1 of Table 1 may be defined as being a state in which the electronic device has a vertical orientation, and the pose angle is within about ±160 degrees.

velocity sensor can be corrected using the acceleration sensor, but the folding angle of the display 450 is inaccurately calculated by the motion sensor modules 420 and 430 only. As an example, the index 1 may include a state in which the variance value of the raw data of the acceleration sensor and the angular velocity sensor is small than 1, but a difference between an average value for a reference time (e.g., 5 seconds) and the first angle associated with the folding angle of the display 450 which is calculated by the angular velocity sensor and the acceleration sensor is not within about ±5 degrees. According to an embodiment, the index 2 may include a state in which the gesture of the electronic device 101 is relatively less because a difference between an average value for a reference time (e.g., 5 seconds) and the first angle associated with the folding angle of the display 450 which is calculated by the angular velocity sensor and the acceleration sensor is within ±5 degrees, the electronic device has a horizontal orientation, and the pose angle is within about ±50 degrees. In this case, it can be determined that the first angle associated with such a folding angle of the display 450 which can be calculated by only the motion sensor modules 420 and 430 without using another module (e.g., the magnetic force sensor module 440) is accurate. According to an embodiment, the index 3 may include a state in which it is determined that the gesture of the electronic device 101 is minimized because a difference between an average value for a reference time (e.g., 5 seconds) and the first angle associated with the folding angle of the display 450 which is calculated by the angular velocity sensor and the acceleration sensor is within

TABLE 1

| Index | State | Meaning |
|---|---|---|
| 0 | A state in which the variance value of the raw data of the acceleration sensor and the angular velocity sensor is 1 or more (e.g., a state in which the electronic device is kept moving) | The first angle is inaccurate, but can be used when the folding angle of the display is calculated like the magnetic force sensor. |
| 1 | A state in which, if the index is not 0, the folding angle of the display which is generated by the angular velocity sensor can be corrected using the acceleration sensor (e.g., a state in which the electronic device has a vertical orientation, and the pose angle is within ±70 degrees) | The first angle is inaccurate, but can be used when the folding angle of the display is calculated like the magnetic force sensor. |
| 2 | A state in which a difference between an average value for a reference time (e.g., 5 seconds) and the folding angle of the display which is calculated by the angular velocity sensor and the acceleration sensor is within ±5 degrees, the electronic device has a horizontal orientation, and the pose angle is within ±50 degrees | The first angle is accurate, can be used by calculating the folding angle of the display using the motion sensor alone, and cannot be corrected by the magnetic force sensor. |
| 3 | A state in which a difference between an average value for a reference time (e.g., 5 seconds) and the folding angle of the display which is calculated by the angular velocity sensor and the acceleration sensor is within ±5 degrees, the electronic device has a horizontal orientation, and the pose angle is within ±10 degrees | The first angle is very accurate, can be used by calculating the folding angle of the display using the motion sensor alone, and can be corrected by the magnetic force sensor. |

According to an embodiment, the index 0 of Table 1 may indicate that the electronic device 101 is kept moving and the first angle associated with the folding angle of the display 450 which is calculated using the motion sensor modules 420 and 430 is inaccurate. According to an embodiment, the index 1 may indicate that, since the electronic device has a vertical orientation and the pose angle is within about ±70, an error of the angle generated by the angular about ±5 degrees, the electronic device has a horizontal orientation, and the pose angle is within about ±10. In this case, it can be determined that the first angle associated with the folding angle of the display 450 is more accurate than that of the index 2, and angle detection reference information of the magnetic force sensor module 440 can be updated based on the first angle associated with the folding angle of the display 450.

According to various embodiments, if the state of the first angle associated with the folding angle of the display 450 is the index 3 of Table 1, the processor 410 may correct the angle detection reference information of the magnetic force sensor module 440 based on the first angle associated with the folding angle of the display 450. According to an embodiment, the processor 410 may detect a second angle associated with the folding angle of the display 450 which corresponds to intensity of a magnetic force obtained through the magnetic force sensor module 440 using the angle detection reference information. The processor 410 may correct the angle detection reference information based on a difference between the second angle associated with the folding angle of the display 450 and the first angle associated with the folding angle of the display 450 which is identified by the motion sensor modules 420 and 430. As an example, the angle detection reference information may include information used as a reference in converting the intensity of the magnetic force detected by the magnetic force sensor module 440 into the folding angle of the display 450.

According to various embodiments, the processor 410 may apply the intensity of the magnetic force detected by the magnetic force sensor module 440 to the previously defined angle detection reference information, and detect the second angle associated with the folding angle of the display 450 which corresponds to the intensity of the magnetic force. As an example, the angle detection reference information may be configured in the form of a table that includes an angle corresponding to the intensity of the magnetic force. As an example, the angle detection reference information may be configured in the form of a mathematical formula that extracts an angle using the intensity of the magnetic force as one variable.

According to an embodiment, the processor 410 may determine the state of the second angle associated with the folding angle of the display 450 based on the intensity of the magnetic force and the first angle associated with the folding angle of the display 450 which is identified by the motion sensor modules 420 and 430. As an example, the state (the accuracy) of the second angle may be defined as in Table 2 below. The state of the second angle may be set based on a difference between the first angle and the second angle.

TABLE 2

| Index | State | Meaning |
| --- | --- | --- |
| 0 | A state in which the intensity of the magnetic force deviates from maximum and minimum magnetic force values defined in the angle detection reference information | The second angle is inaccurate, and can be used to calculate the folding angle of the display like the motion sensor. |
| 1 | A state in which a difference between the folding angle detected by the magnetic force sensor and the folding angle of the display which is calculated by the motion sensor is ±30 degrees or more | The second angle is inaccurate, and can be used to calculate the folding angle of the display like the motion sensor. |
| 2 | A state in which a difference between the folding angle detected by the magnetic force sensor and the folding angle of the display which is calculated by the motion sensor is within ±30 degrees | The second angle can be used to calculate the folding angle of the display like the motion sensor. |
| 3 | A state in which a difference between the folding angle detected by the magnetic force sensor and the folding angle of the display which is calculated by the motion sensor is within ±30 degrees, and a change in the folding angle of the display which is calculated by the magnetic force sensor is within ±5 degrees for a reference time (e.g., 1 second) | The second angle can be used to calculate the folding angle of the display, and can correct a cumulative error of the motion sensor due to high accuracy. |

According to various embodiments, the processor 410 may identify the second angle associated with the folding angle of the display 450 and an index associated with a state of the second angle using the magnetic force sensor module 440. As an example, the second angle may include the folding angle of the display 450 which is estimated using the magnetic force sensor module 440 only. As an example, the state of the second angle may include accuracy of the second angle. As an example, the magnetic force sensor module 440 is operated in the same principle as a geomagnetic sensor that measures a magnetic field of the Earth, but may be set to be different in a measurement range of the magnetic force from the geomagnetic sensor. For example, the measurement range of the magnetic force of the magnetic force sensor module 440 is within about ±400 G, and the measurement range of the magnetic force of the geomagnetic sensor is within about ±40 G.

According to an embodiment, the processor 410 may apply the intensity of the magnetic force detected by the According to various embodiments, the processor 410 may detect the folding angle of the display 450 using the motion sensor modules 420 and 430 and the magnetic force sensor module 440. According to an embodiment, the processor 410 may periodically detect the folding angle of the display 450 based on indexes (e.g., accuracy) of the first and second angles associated with the folding angle of the display 450. As an example, the folding angle of the display 450 may be indicated by a folded angle between the first housing structure (e.g., the first housing structure 210 of FIG. 2A) and the second housing structure (e.g., the second housing structure 220 of FIG. 2A) in which the display 450 is disposed.

According to an embodiment, if the index of the first angle associated with the folding angle of the display 450 which is detected using the motion sensor modules 420 and 430 or the index of the second angle associated with the folding angle of the display 450 which is detected using the magnetic force sensor module 440 satisfies a designated first condition, the processor 410 may determine that the first angle or the second angle associated with the folding angle of the display 450 is reliable. As an example, the indexes of the first and second angles satisfy the designated first condition, the processor 410 may detect the folding angle of the display 450 based on any one angle (e.g., the first angle) depending on a predefined priority order. As an example, the priority order may be set based on at least one of accuracy of a sensor that detects an angle or a type of the sensor. As an example, the designated first condition may include a condition that the index of the first or second angle associated with the folding angle of the display 450 is larger than or equal to 3.

According to an embodiment, if the index of the first angle associated with the folding angle of the display 450 which is detected using the motion sensor modules 420 and 430 satisfies a designated second condition, the processor 410 may determine that the first angle associated with the folding angle of the display 450 is unreliable. The folding angle of the display 450 may be detected based on the second angle associated with the folding angle of the display 450 which is detected using the magnetic force sensor module 440. As an example, the designated second condition may include a condition that the index of the second angle associated with the folding angle of the display 450 is 0.

According to an embodiment, if the index of the first angle associated with the folding angle of the display 450 which is detected using the motion sensor modules 420 and 430 or the index of the second angle associated with the folding angle of the display 450 which is detected using the magnetic force sensor module 440 satisfies a designated third condition, the processor 410 may determine that the second angle is more reliable than the first angle. The folding angle of the display 450 may be detected based on the second angle associated with the folding angle of the display 450. As an example, the designated third condition may include a condition that the index of the first angle associated with the folding angle of the display 450 is smaller than 3 and larger than 0 and a condition that the index of the second angle associated with the folding angle of the display 450 is larger than or equal to 2.

According to an embodiment, if the index of the first angle associated with the folding angle of the display 450 and the index of the second angle associated with the folding angle of the display 450 satisfy the designated third condition, the processor 410 may detect the folding angle of the display 450 based on the first angle and the second angle. In this case, the processor 410 may set a weight of the second angle to be higher than the first angle.

According to an embodiment, if the index of the first angle associated with the folding angle of the display 450 which is detected using the motion sensor modules 420 and 430 or the index of the second angle associated with the folding angle of the display 450 which is detected using the magnetic force sensor module 440 satisfies a designated fourth condition, the processor 410 may detect the folding angle of the display 450 based on the first angle and the second angle. In this case, the processor 410 may set a weight of the first angle to be higher than the second angle. As an example, the designated fourth condition may include a condition that the index of the first angle associated with the folding angle of the display 450 is smaller than 3 and larger than 0 and a condition that the index of the second angle associated with the folding angle of the display 450 is smaller than 2 and is larger than or equal to 1.

According to various embodiments, if the folding angle of the display 450 is requested from at least one application program, the processor 410 may apply a most recently detected folding angle of the display 450 to the application program. As an example, the most recently detected folding angle of the display 450 may include a folding angle of the display 450 which is detected at a point in time closest to a point in time when the application program request the folding angle of the display 450.

According to various example embodiments, the electronic device may include: a foldable housing including a hinge, a first housing connected to the hinge, and a second housing connected to the hinge, and is configured to be folded about the hinge relative to the first housing; a first motion sensor disposed in at least a part of the first housing structure; a second motion sensor disposed in at least a part of the second housing; a magnetic force sensor disposed in at least a part of the first housing structure; a magnetic body disposed in at least a part of the second housing; and at least one processor operably connected to the first motion sensor, the second motion sensor, and the magnetic force sensor. The at least one processor 120 may be configured to: identify a folded first angle between the first housing and the second housing based on the first motion sensor and the second motion sensor, and a first index associated with a state of the first angle; identify a folded second angle between the first housing and the second housing based on the magnetic force sensor, and a second index associated with a state of the second angle; and determine the folded angle between the first housing and the second housing based on at least one of the first angle or the second angle based on the first index and the second index.

According to various example embodiments, the first motion sensor and the second motion sensor may include a combination of at least two of an acceleration sensor, an angular velocity sensor, or a geomagnetic sensor.

According to various example embodiments, the magnetic force sensor included in a first housing and the magnetic body included in a second housing may adjoin the hinge, and be disposed to at least partly face each other in the folded state.

According to various example embodiments, the processor may be configured to generate the first index associated with the state of the first angle based on at least one of gesture information of the electronic device, an orientation of the electronic device, or an angle of the electronic device.

According to various example embodiments, the processor may be configured to generate the second index associated with the state of the second angle based on at least one of intensity of a magnetic force measured by the magnetic force sensor module or a difference between the first angle and the second angle.

According to various example embodiments, based on the first index satisfying a designated first condition, the processor may be configured to determine the folded angle between the first housing and the second housing based on the first angle.

According to various example embodiments, based on the first index satisfying a designated second condition, the processor may be configured to determine the folded angle between the first housing and the second housing based on the second angle.

According to various example embodiments, based on the first index and the second index satisfying a designated third condition, the processor may be configured to determine the folded angle between the first housing and the second housing based on the second angle.

According to various example embodiments, based on the first index and the second index satisfying a designated fourth condition, the processor may be configured to determine the folded angle between the first housing and the second housing based on the first angle and the second angle.

According to various example embodiments, based on the second index satisfying a designated fifth condition, the processor may be configured to determine the folded angle between the first housing and the second housing based on the second angle.

According to various example embodiments, based on the first index satisfying the designated first condition, the processor may be configured to update angle estimation reference information of the magnetic force sensor based on the first angle.

Figure 5:
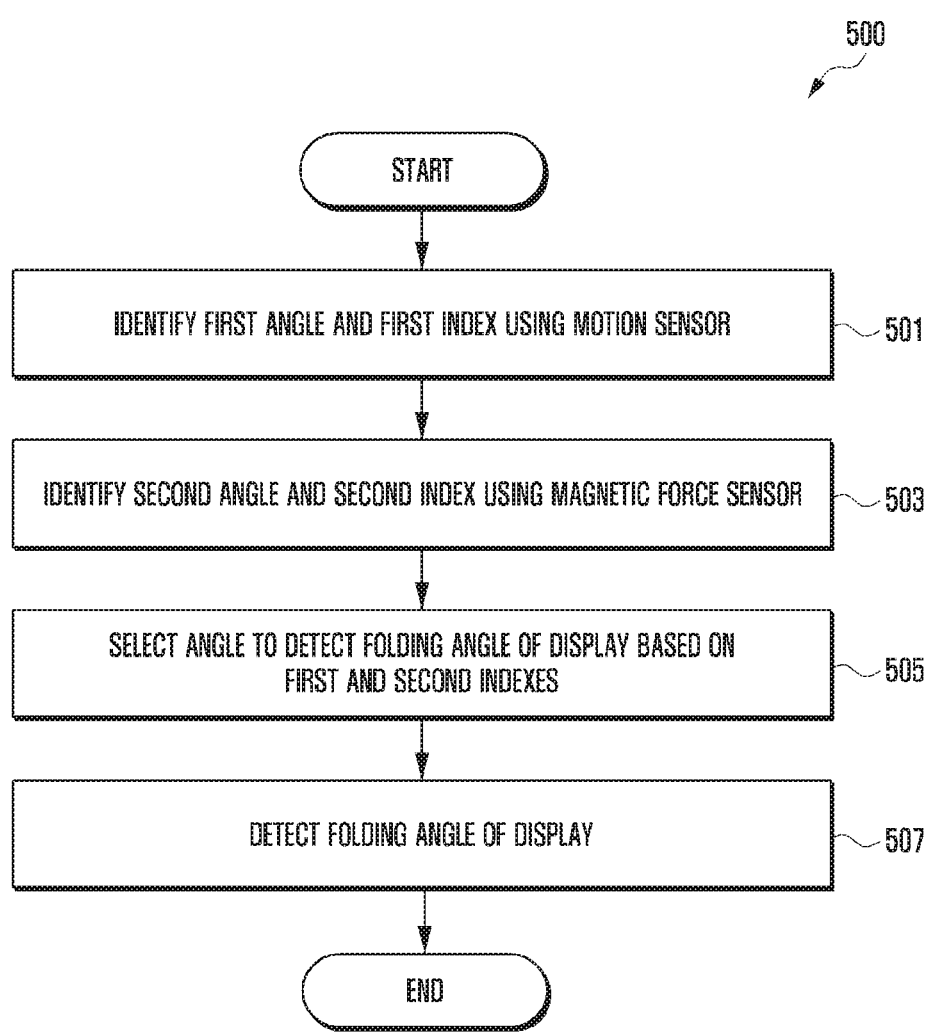
FIG. 5 is a flowchart illustrating an example operation of detecting a folding angle of the display in the electronic device according to various embodiments.

FIG. 5 is a flowchart 500 illustrating an example operation of detecting a folding angle of the display in the electronic device according to various embodiments. In the following embodiments, processes may be performed in order, but are not necessarily performed in order. For example, the order of the processes may be changed, and at least two processes may be performed in parallel. Here, the electronic device may be the electronic device 101 of FIG. 1 or FIG. 4A.

Referring to FIG. 5, according to various embodiments, in operation 501, the electronic device (e.g., the processor 120 of FIG. 1 or the processor 410 of FIG. 4A) may identify a first angle associated with a folding angle of the display and a first index associated with a state of the first angle using the motion sensor. According to an embodiment, the processor 120 may detect a changed angle between the first housing structure and the second housing structure based on changed angular velocity data of the first housing structure (e.g., the first housing structure 310 of FIG. 3A) and the second housing structure (e.g., the second housing structure 320 of FIG. 3A) which is obtained by the motion sensor modules 420 and 430. The processor 120 may correct an error of the changed angle between the first housing structure and the second housing structure based on acceleration data of the first housing structure and the second housing structure which is obtained by the motion sensor modules 420 and 430. As an example, the first angle associated with the folding angle of the display may include the changed angle between the first housing structure and the second housing structure, the error of which is corrected. According to an embodiment, the processor 120 may determine the state of the first angle associated with the folding angle of the display based on at least one of gesture information of the electronic device 101, an orientation (e.g., a horizontal or vertical orientation of the electronic device 101, or a pose angle of the electronic device 101. As an example, the state of the first angle may include accuracy of the first angle.

According to various embodiments, in operation 503, the electronic device (e.g., the processor 120 or 410) may identify a second angle associated with the folding angle of the display and a second index associated with a state of the second angle using the magnetic force sensor. According to an embodiment, the processor 120 may detect the second angle associated with the folding angle of the display which corresponds to intensity of a magnetic force obtained by the magnetic force sensor module 440 in the angle detection reference information. According to an embodiment, the processor 120 may determine the state of the associated with the folding angle of the display based on the intensity of the magnetic force obtained by the magnetic force sensor module 440 and the first angle associated with the folding angle of the display. As an example, the state of the second angle may include accuracy of the second angle.

According to various embodiments, in operation 505, the electronic device (e.g., the processor 120 or 410) may select at least one of the first angle and the second angle as an angle for use in detecting the folding angle of the display based on the first index and the second index. According to an embodiment, if it is determined based on the first index or the second index that the first angle or the second angle is reliable, the processor 120 may select the first angle or the second angle as an angle for use in detecting the folding angle of the display. According to an embodiment, if it is determined based on the first index that the first angle is unreliable, the processor 120 may select the second angle as an angle for use in detecting the folding angle of the display. According to an embodiment, the processor 120 may select the first angle and the second angle as angles for use in detecting the folding angle of the display based on the first index and the second index.

According to various embodiments, in operation 507, the electronic device (e.g., the processor 120 or 410) may detect the folding angle of the display based on at least one of the first angle and the second angle which is selected based on the first index and the second index. According to an embodiment, if the first angle and the second angle are used to detect the folding angle of the display, the processor 120 may set weights to be applied to the first angle and the second angle based on the first index and the second index. As an example, the processor 120 may set a weight of an angle having a large index value to be higher than the other angles.

According to various embodiments, the electronic device may perform operations 501, 503, 505 and 507 of FIG. 5 to detect the folding angle of the display by periods.

Figure 6:
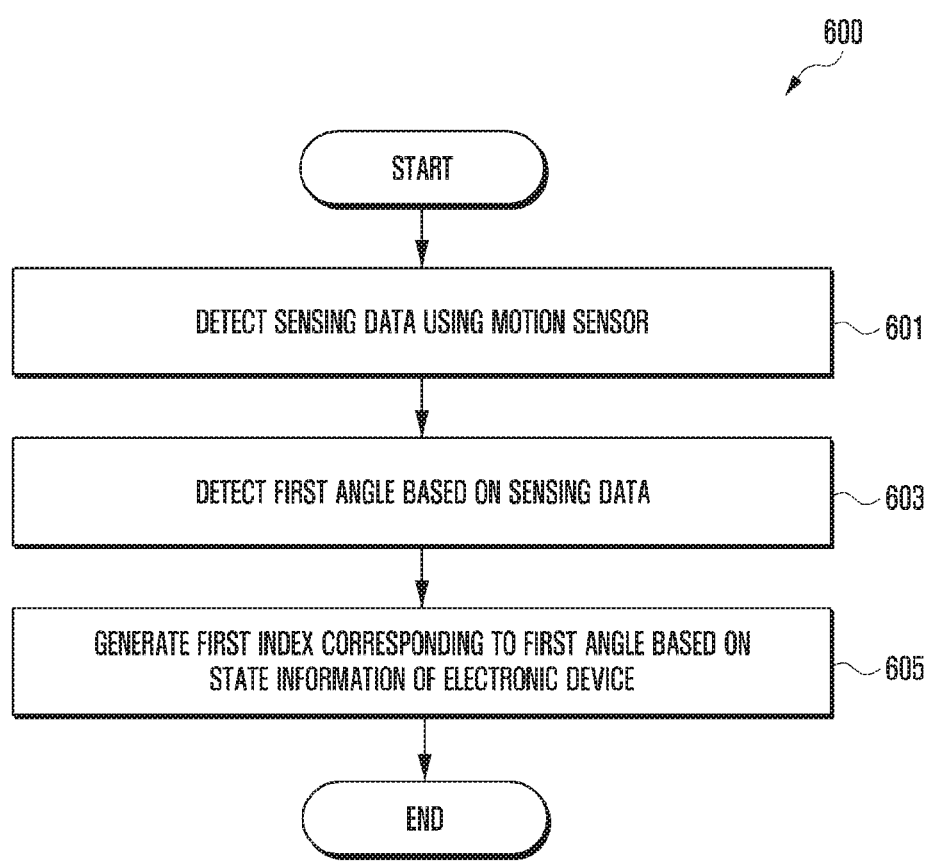
FIG. 6 is a flowchart illustrating an example operation of detecting a folding angle of the display using a motion sensor in the electronic device according to various embodiments.

FIG. 6 is a flowchart 600 illustrating an example operation of detecting a folding angle of the display using a motion sensor in the electronic device according to various embodiments. Processes of FIG. 6 to be described below may be detailed processes of process 501 of FIG. 5. In the following embodiments, the processes may be performed in order, but are not necessarily performed in order. For example, the order of the processes may be changed, and at least two processes may be performed in parallel. Here, the electronic device may be the electronic device 101 of FIG. 1 or FIG. 4A.

Referring to FIG. 6, according to various embodiments, in operation 601, the electronic device (e.g., the processor 120 of FIG. 1 or the processor 410 of FIG. 4A) may detect sensing data using the motion sensor. According to an embodiment, the processor 120 may detect changed angular velocity data and changed acceleration data of the first housing structure (e.g., the first housing structure 310 of FIG. 3A) and the second housing structure (e.g., the second housing structure 320 of FIG. 3A) using the motion sensor modules 420 and 430. As an example, the motion sensor modules 420 and 430 may be configured by a combination of at least two of an acceleration sensor, an angular velocity sensor, or a geomagnetic sensor.

According to various embodiments, in operation 603, the electronic device (e.g., the processor 120 or 410) may detect a first angle associated with a folding angle of the display based on the sensing data detected by the motion sensor. According to an embodiment, the processor 120 may analyze (e.g., integrate) the changed angular velocity data of the first housing structure and the second housing structure which is detected by the motion sensor modules 420 and 430, and detect a changed angle between the first housing structure and the second housing structure. The processor 120 may detect the angle between the first housing structure and the second housing structure based on the analysis of the acceleration data corresponding to gestures of the first housing structure and the second housing structure which are detected by the motion sensor modules 420 and 430. The processor 120 may correct the changed angle between the first housing structure and the second housing structure which are detected based on the angular velocity data using the angle between the first housing structure and the second housing structure which are detected based on the acceleration data, and generate the first angle associated with the folding angle of the display.

According to various embodiments, in operation 605, the electronic device (e.g., the processor 120 or 410) may generate a first index corresponding to the state of the first angle associated with the folding angle of the display based on state information of the electronic device. As an example, the state information of the electronic device may include at least one of the gesture information of the electronic device 101, the orientation (e.g., the horizontal or vertical orientation of the electronic device 101, or the pose angle of the electronic device 101. As an example, the first index corresponding to the state of the first angle associated with the folding angle of the display may be defined as in Table 1.

Figure 7:
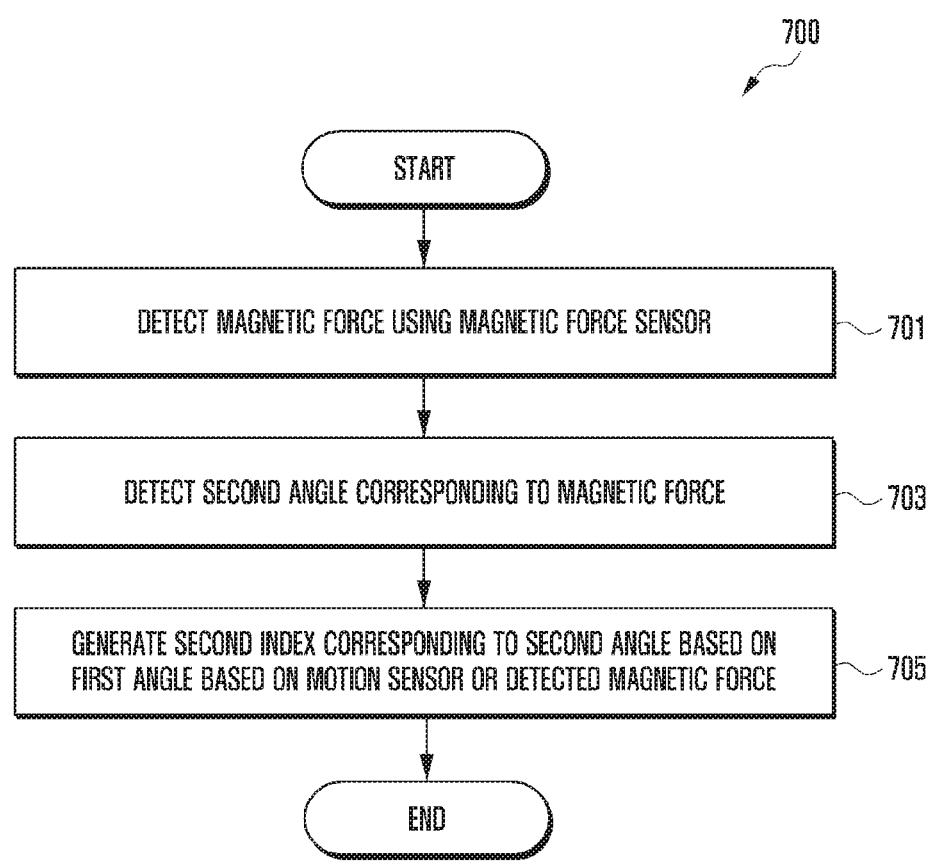
FIG. 7 is a flowchart illustrating an example operation of detecting a folding angle of the display using a magnetic force sensor in the electronic device according to various embodiments.

FIG. 7 is a flowchart illustrating an example operation of detecting a folding angle of the display using a magnetic force sensor in the electronic device according to various embodiments. Processes of FIG. 7 to be described below may be detailed processes of process 503 of FIG. 5. In the following embodiments, the processes may be performed in order, but are not necessarily performed in order. For example, the order of the processes may be changed, and at least two processes may be performed in parallel. Here, the electronic device may be the electronic device 101 of FIG. 1 or FIG. 4A.

Referring to FIG. 7, according to various embodiments, in operation 701, the electronic device (e.g., the processor 120 of FIG. 1 or the processor 410 of FIG. 4A) may detect a magnetic force using the magnetic force sensor. According to an embodiment, the processor 120 may identify intensity of the magnetic force detected by the magnetic force sensor module 440. As an example, the magnetic force sensor module 440 is different in only a measurement range of the magnetic force from the geomagnetic sensor, and may equally use a principle that measures the magnetic force.

According to various embodiments, in operation 703, the electronic device (e.g., the processor 120 or 410) may detect a second angle associated with a folding angle of the display which corresponds to the magnetic force detected by the magnetic force sensor. According to an embodiment, the processor 120 may detect the second angle associated with the folding angle of the display which corresponds to the magnetic force detected by the magnetic force sensor module 440 in angle detection reference information configured in the form of a table. According to an embodiment, the processor 120 may apply the magnetic force detected by the magnetic force sensor module 440 in angle detection reference information configured in the form of a mathematical formula, and calculate the second angle associated with the folding angle of the display.

According to various embodiments, in operation 705, the electronic device (e.g., the processor 120 or 410) may generate a second index corresponding to the second angle associated with the folding angle of the display based on the first angle associated with the folding angle of the display which is detected using the motion sensor or the intensity of the magnetic force detected by the magnetic force sensor. According to an embodiment, if the intensity of the magnetic force detected by the magnetic force sensor deviates from a range of maximum and minimum magnetic forces defined in the angle detection reference information, the processor 120 may determine that the second angle associated with the folding angle of the display is unreliable. The second index may be set to a value (e.g. "0") indicating the second angle associated with the folding angle of the display is unreliable. According to an embodiment, the processor 120 may set the second index representing a state of the second angle associated with the folding angle of the display based on a difference the first angle associated with the folding angle of the display which is detected using the motion sensor modules 420 and 430. As an example, the second index corresponding to the state of the second angle associated with the folding angle of the display may be defined as in Table 2.

Figure 8:
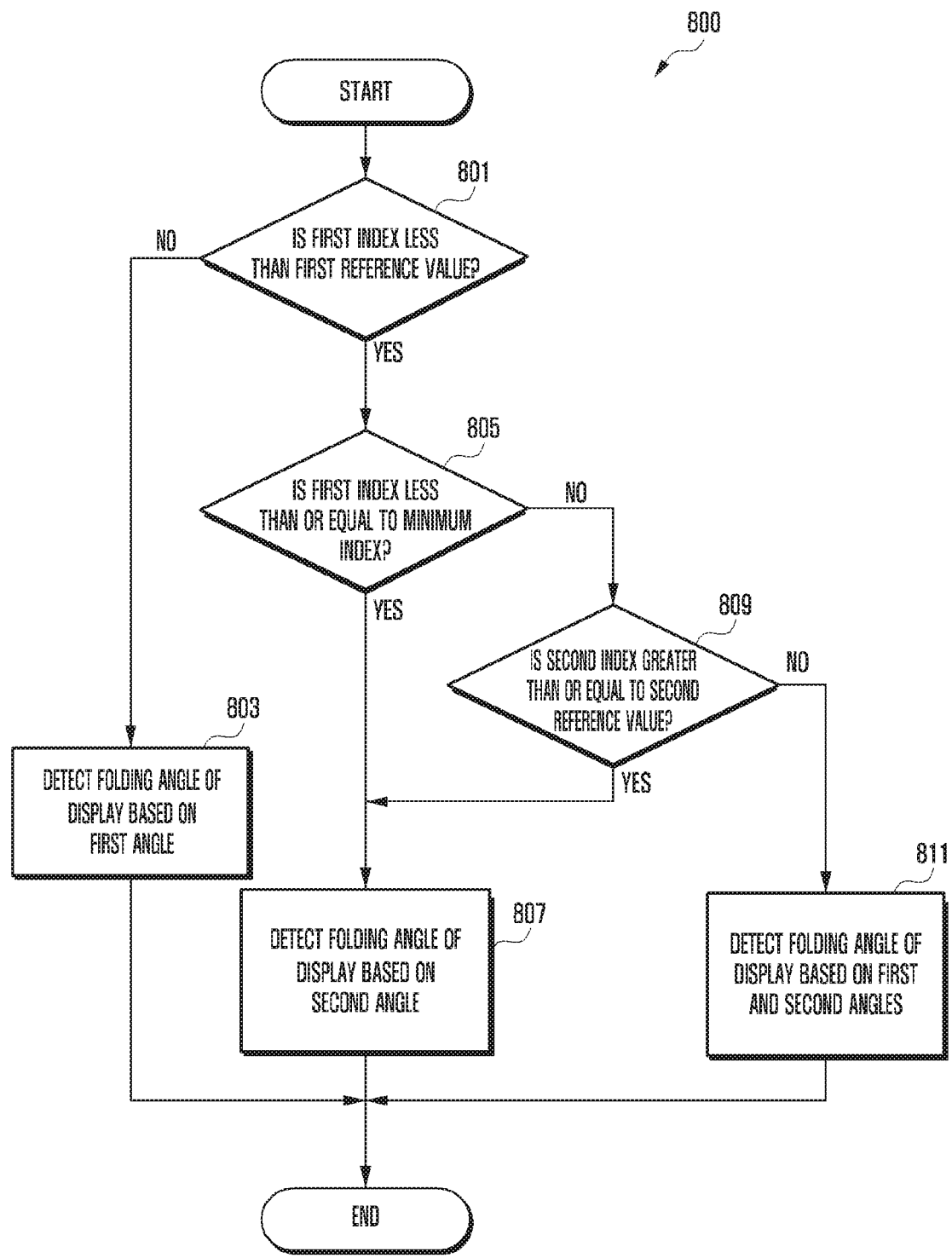
FIG. 8 is a flowchart illustrating an example operation of detecting a folding angle of the display based on accuracy information of the motion sensor and the magnetic force sensor in the electronic device according to various embodiments.

FIG. 8 is a flowchart illustrating an example operation of detecting a folding angle of the display based on accuracy information of the motion sensor and the magnetic force sensor in the electronic device according to various embodiments. Processes of FIG. 8 to be described below may be detailed processes of processes 505 to 507 of FIG. 5. In the following embodiments, the processes may be performed in order, but are not necessarily performed in order. For example, the order of the processes may be changed, and at least two processes may be performed in parallel. Here, the electronic device may be the electronic device 101 of FIG. 1 or FIG. 4A.

Referring to FIG. 8, according to various embodiments, in operation 801, the electronic device (e.g., the processor 120 of FIG. 1 or the processor 410 of FIG. 4A) may determine whether the first index corresponding to the first angle associated with the folding angle of the display detected using the motion sensor modules 420 and 430 is less than a first reference value (e.g., 3).

According to various embodiments, in operation 803, if the first index corresponding to the first angle associated with the folding angle of the display is greater than or equal to the first reference value (e.g., NO of operation 801), the electronic device (e.g., the processor 120 or 410) may detect the folding angle of the display based on the first angle associated with the folding angle of the display. According to an embodiment, if the first index of the first angle associated with the folding angle of the display 450 which is detected using the motion sensor modules 420 and 430 is greater than or equal to the first reference value (e.g., the first index=3), the processor 120 may determine that the first angle associated with the folding angle of the display 450 is reliable. It is determined that the first angle associated with the folding angle of the display 450 is reliable, the folding angle of the display 450 may be set to the first angle associated with the folding angle of the display 450.

According to various embodiments, in operation 805, if the first index corresponding to the first angle associated with the folding angle of the display is less than the first reference value (e.g., YES of operation 801), the electronic device (e.g., the processor 120 or 410) may determine whether the first index is less than or equal to a minimum index (e.g., "0"). As an example, the minimum index is the lowest value of the indexes corresponding to the accuracy of the first angle associated with the folding angle of the display which is defined as in Table 1, and may indicate the state in which the first angle associated with the folding angle of the display is unreliable.

According to various embodiments, in operation 807, if the first index corresponding to the first angle associated with the folding angle of the display is less than or equal to the minimum index (e.g., YES of operation 805) (e.g., the first index=0), the electronic device (e.g., the processor 120 or 410) may detect the folding angle of the display based on the second angle associated with the folding angle of the display which is detected by the magnetic force sensor. According to an embodiment, if the first index of the first angle associated with the folding angle of the display 450 which is detected using the motion sensor modules 420 and 430 is less than or equal to the minimum index, the processor 120 may determine that the first angle associated with the folding angle of the display 450 is unreliable. If it is determined that the first angle associated with the folding angle of the display 450 is unreliable, the folding angle of the display 450 may be set to the second angle associated with the folding angle of the display 450 which is detected using the magnetic force sensor module 440.

According to various embodiments, in operation 809, if the first index corresponding to the first angle associated with the folding angle of the display is greater than the minimum index (e.g., NO of operation 803'), the electronic device (e.g., the processor 120 or 410) may determine whether a second index corresponding to the second angle associated with the folding angle of the display which is detected by the magnetic force sensor is greater than or equal to a second reference value (e.g., 2).

According to various embodiments, in operation 807, if the second index corresponding to the second angle associated with the folding angle of the display is larger than or equal to the second reference value (e.g., YES of operation 809), the electronic device (e.g., the processor 120 or 410) may detect the folding angle of the display based on the second angle associated with the folding angle of the display which is detected by the magnetic force sensor. According to an embodiment, if the second index of the second angle associated with the folding angle of the display 450 is greater than or equal to the second reference value (e.g., 2), the electronic device (e.g., the processor 120 or 410) may determine that the second angle associated with the folding angle of the display 450 is reliable. In this case, the processor 120 may set the second angle, associated with the folding angle of the display 450 which is detected using the magnetic force sensor module 440, to the folding angle of the display 450.

According to various embodiments, in operation 811, the second index corresponding to the second angle associated with the folding angle of the display is less than the second reference value (e.g., NO of operation 809), the electronic device (e.g., the processor 120 or 410) may detect the folding angle of the display based on the first angle associated with the folding angle of the display and the second angle associated with the folding angle of the display. According to an embodiment, if the first index of the first angle associated with the folding angle of the display 450 is less than the first reference value and is greater than the minimum index (e.g., the first index=1 or 2), and if the second index of the second angle associated with the folding angle of the display 450 is smaller than the second reference value (e.g., the second index=0 or 1), the processor 120 may apply weights to the first angle associated with the folding angle of the display 450 and the second angle associated with the folding angle of the display 450, and detect the folding angle of the display 450. The weights may be set based on the state of the first angle and the state of the second angle. As an example, the weight of the first angle may be set to be greater than that of the second angle if the index of the first angle is greater than that of the second angle. As an example, the weight of the second angle may be set to be greater than that of the first angle if the index of the second angle is greater than that of the first angle. As an example, the weight of the first angle may be set to be equal to that of the second angle if the index of the first angle is equal to that of the second angle.

According to various embodiments, if the indexes of the first and second angles associated with the folding angle of the display are set to a value between the minimum index (e.g., 0) and the maximum index (e.g., 3), the electronic device (e.g., the processor 120 or 410) may detect the folding angle of the display based on the first angle associated with the folding angle of the display and the second angle associated with the folding angle of the display. According to an embodiment, if the first and second indexes of the first and second angles associated with the folding angle of the display 450 are less than the first reference value (e.g., 3) and are greater than the minimum index (e.g., 0) (e.g., the first and second indexes=1 or 2), the processor 120 may apply weights to the first angle associated with the folding angle of the display 450 and the second angle associated with the folding angle of the display 450, and detect the folding angle of the display 450. The weights may be set based on the value of the first index of the first angle and the value of the second index of the second angle.

Figure 9:
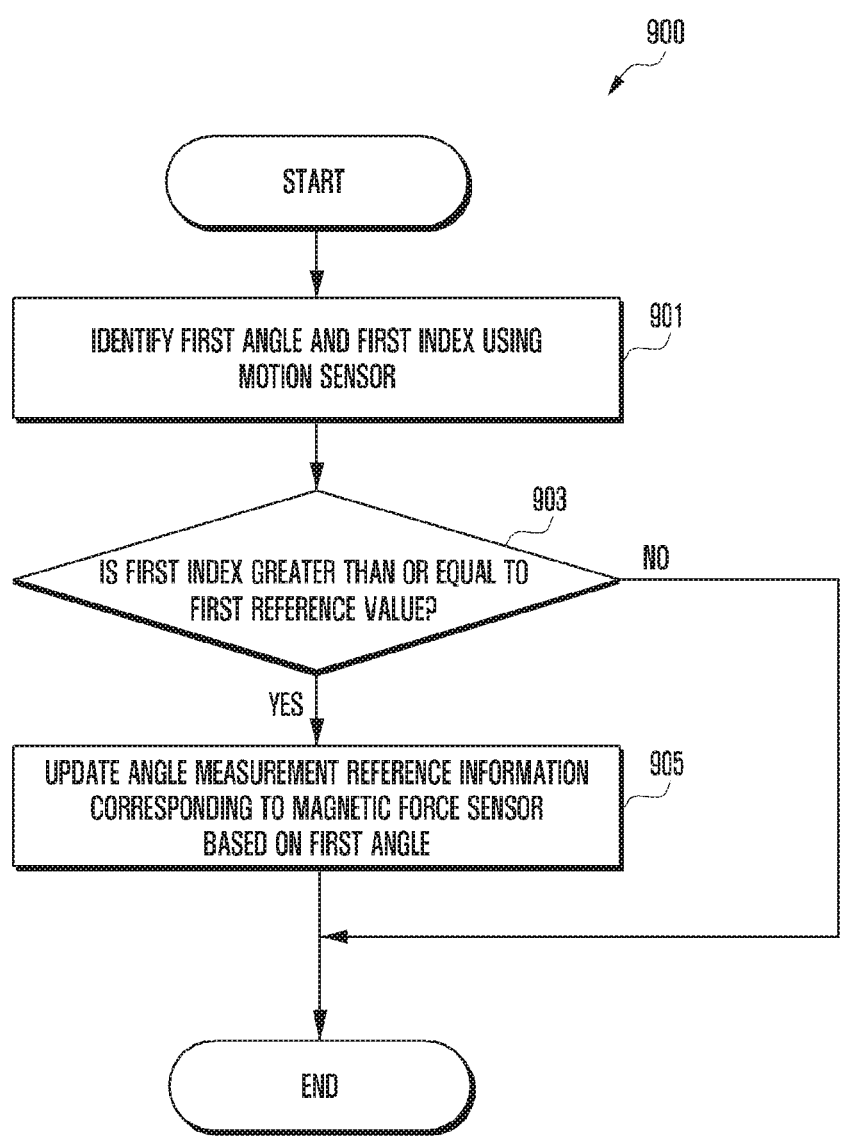
FIG. 9 is a flowchart illustrating an example operation of updating angle detection reference information of the magnetic force sensor in the electronic device according to various embodiments.

FIG. 9 is a flowchart illustrating an example operation of updating angle detection reference information of the magnetic force sensor in the electronic device according to various embodiments. In the following embodiments, processes may be performed in order, but are not necessarily performed in order. For example, the order of the processes may be changed, and at least two processes may be performed in parallel. Here, the electronic device may be the electronic device 101 of FIG. 1 or FIG. 4A.

Referring to FIG. 9, according to various embodiments, in operation 901, the electronic device (e.g., the processor 120 of FIG. 1 or the processor 410 of FIG. 4A) may identify the first angle associated with the folding angle of the display and the first index corresponding to the first angle using the motion sensor. According to an embodiment, the processor 120 may detect a changed angle between the first housing structure and the second housing structure based on changed angular velocity data and changed acceleration data of the first housing structure (e.g., the first housing structure 310 of FIG. 3A) and the second housing structure (e.g., the second housing structure 320 of FIG. 3A) which are obtained by the motion sensor modules 420 and 430. The first angle associated with the folding angle of the display may include the changed angle between the first housing structure and the second housing structure. According to an embodiment, processor 120 may set a first index corresponding to a state of the first angle associated with the folding angle of the display based on state information of the electronic device 101. As an example, the state information of the electronic device 101 may include at least one of the gesture information of the electronic device 101, the orientation (e.g., the horizontal or vertical orientation of the electronic device 101, or the pose angle of the electronic device 101).

According to various embodiments, in operation 903, the electronic device (e.g., the processor 120 or 410) may determine whether the first index corresponding to the first angle associated with the folding angle of the display which is detected using the motion sensor is greater than or equal to a first reference value (e.g., 3). According to an embodiment, the processor 120 may compare the first index with the first reference value, and determine whether or not the first angle associated with the folding angle of the display 450 which is detected using the motion sensor modules 420 and 430 is reliable.

According to various embodiments, in operation 905, if the first index corresponding to the first angle associated with the folding angle of the display which is detected using the motion sensor is greater than or equal to the first reference value (e.g., 3) (e.g., YES of operation 903), the electronic device (e.g., the processor 120 or 410) may update angle measurement reference information corresponding to the magnetic force sensor based on the first angle. According to an embodiment, if the first index of the first angle associated with the folding angle of the display 450 is greater than or equal to the first reference value, the processor 120 may determine that the first angle associated with the folding angle of the display 450 is reliable. Thus, the processor 120 may correct the angle detection reference information based on a difference between the second angle associated with the folding angle of the display 450 which is detected using the magnetic force sensor module 440 and the first angle associated with the folding angle of the display 450 which is identified by the motion sensor modules 420 and 430. As an example, the processor 120 may adjust a value of an angle, which is matched with the intensity of the magnetic force defined in the angle detection reference information, by the difference between the first angle associated with the folding angle of the display 450 and the second angle associated with the folding angle of the display 450. As an example, the processor 120 may correct the angle detection reference information such that the first angle associated with the folding angle of the display 450 which is identified by the motion sensor modules 420 and 430 is matched with the intensity of the magnetic force detected by the magnetic force sensor module 440.

According to various embodiments, the electronic device 101 may provide a user interface corresponding to the folding angle of the display which is detected by the motion sensor modules and the magnetic force sensor module. According to an embodiment, the processor 120 may provide user interfaces different from each other based on the folding directions of the first housing structure and the second housing structure.

Figure 10A:
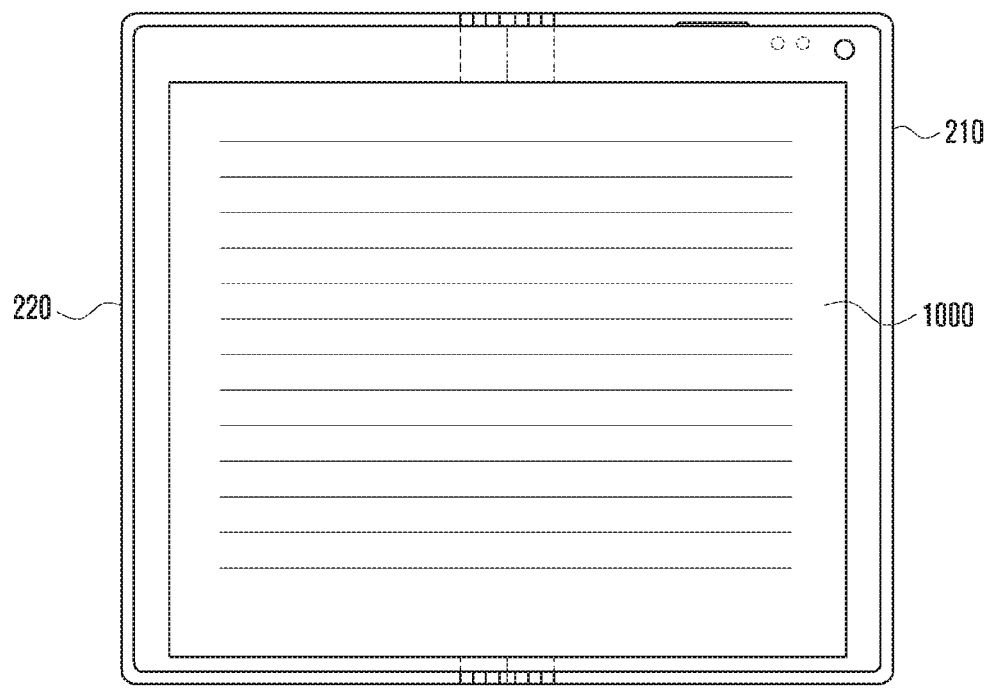
FIG. 10A is a diagram illustrating an example screen configuration of the electronic device unfolded in a first folding direction according to various embodiments.
Figure 10B:
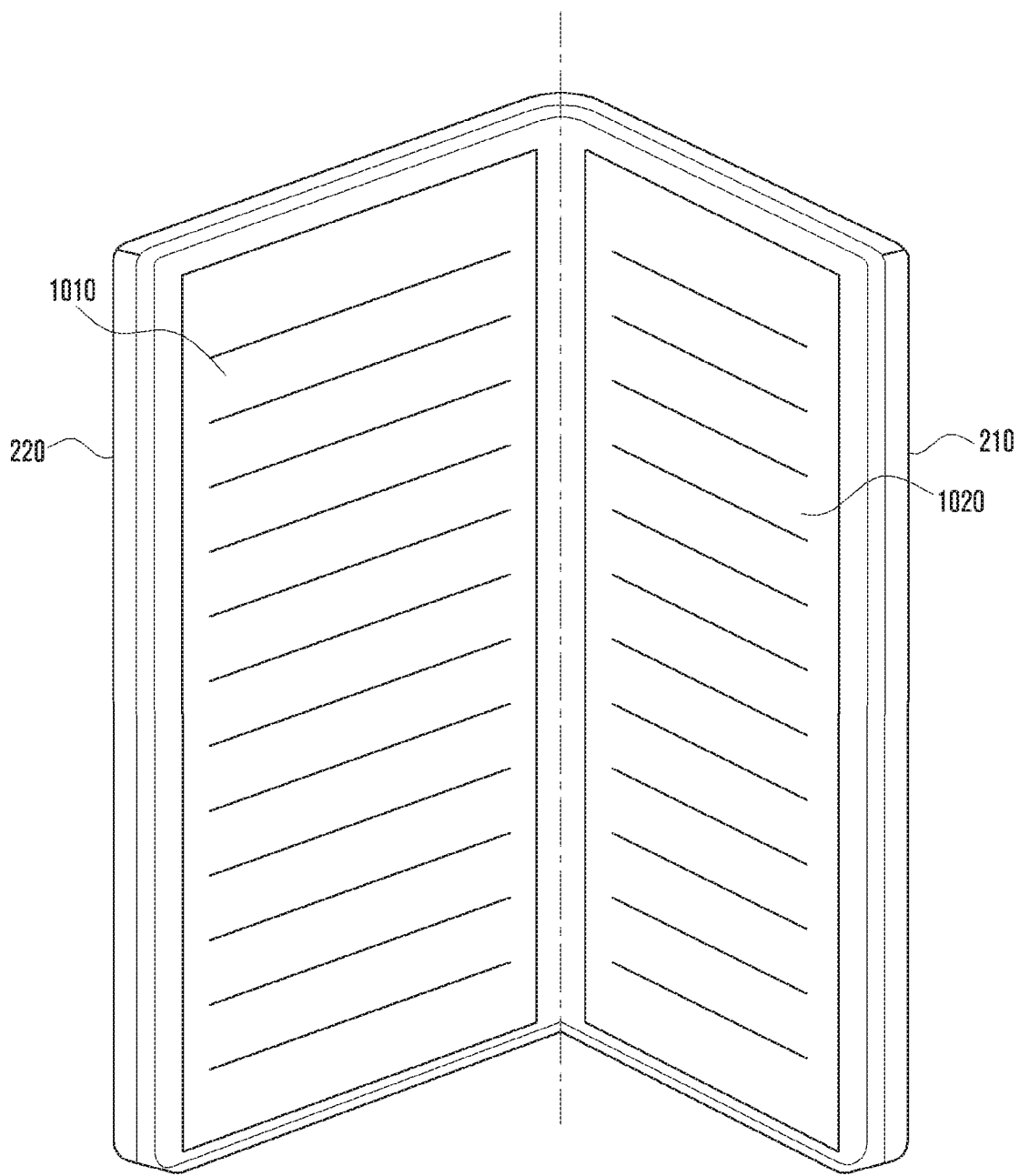
FIG. 10B is a diagram illustrating an example screen configuration of the electronic device folded at a certain angle in the first folding direction according to various embodiments.

FIG. 10A is a diagram illustrating an example screen configuration of the electronic device unfolded in a first folding direction according to various embodiments. FIG. 10B is a diagram illustrating an example screen configuration of the electronic device folded at a certain angle in the first folding direction according to various embodiments. In the following description, as in FIGS. 2A and 2B, the electronic device may be the electronic device 101 having a structure in which the first housing structure 210 or the second housing structure 220 is folded about the folding axis A (e.g., the folding axis of the vertical orientation) in the first folding direction (the horizontal orientation).

According to various embodiments, if the electronic device is in the unfolded state (the flat state), the first housing structure 210 and the second housing structure 220 may be disposed at an angle of 180 degrees, and form one plane. In this case, as in FIG. 10A, the electronic device may display content 1000 on the display 230 disposed in the first housing structure 210 and the second housing structure 220. As an example, if an application program associated with an electronic book is executed, the display 230 may display one page 1000 of the electronic book.

According to various embodiments, if the electronic device is in the intermediated state, the first housing structure 210 and the second housing structure 220 may be disposed at a certain angle (e.g., about 90 to 130 degrees), and form two planes. In this case, as in FIG. 10B, the electronic device may display content 1010 and content 1020, which are different from each other, on the first region of the display 230 disposed in the first housing structure 210 and the second region of the display 230 disposed in the second housing structure 220. As an example, if the application program associated with the electronic book is executed, the display 230 may display a certain page 1010 of the electronic book on the first region thereof, and the next page 1020 of the electronic book on the second region thereof.

According to an embodiment, if the angle formed by the first housing structure 210 and the second housing structure 220 is changed in the intermediate state, the electronic device may change the user interface used to display content on the display 230 based on the angle formed by the first housing structure 210 and the second housing structure 220.

Figure 11A:
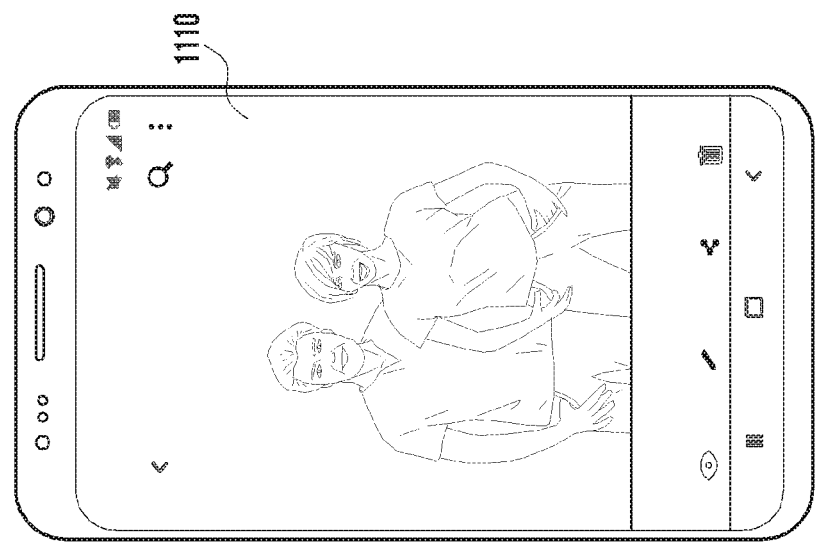
FIG. 11A is a diagram illustrating an example screen configuration of the electronic device unfolded in a second folding direction according to various embodiments.
Figure 11A:
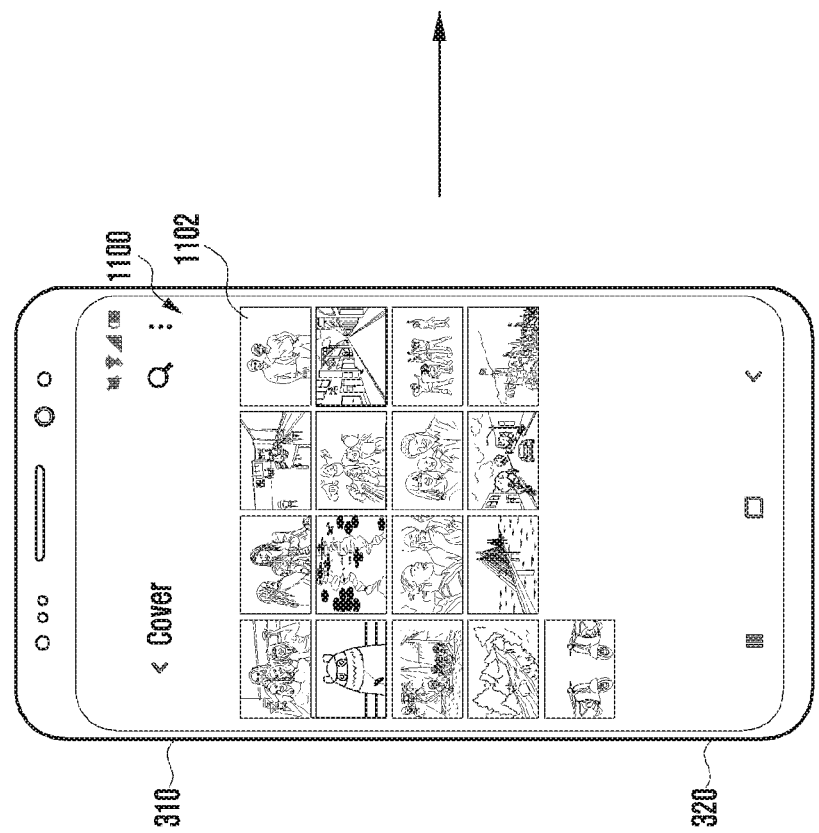
Figure 11B:
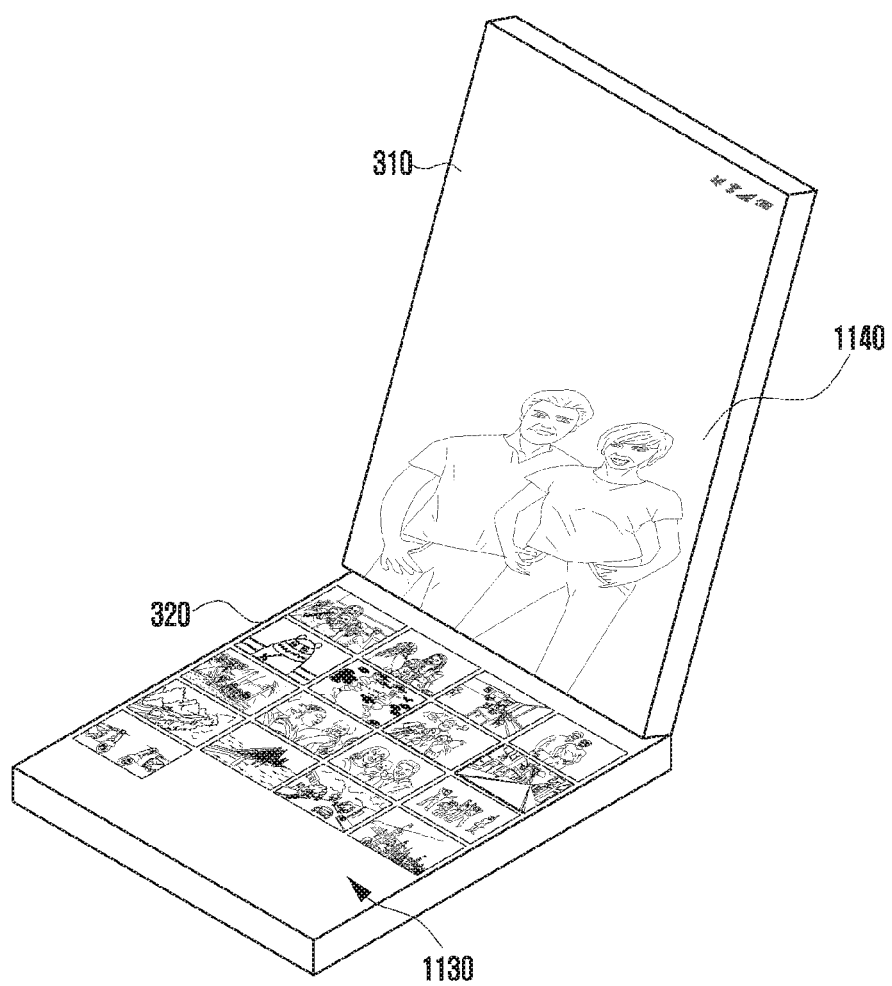
FIG. 11B is a diagram illustrating an example screen configuration of the electronic device folded at a certain angle in the second folding direction according to various embodiments.

FIG. 11A is a diagram illustrating an example screen configuration of the electronic device unfolded in a second folding direction according to various embodiments. FIG. 11B is a diagram illustrating an example screen configuration of the electronic device folded at a certain angle in the second folding direction according to various embodiments. In the following description, as in FIGS. 3A and 3B, the electronic device may be the electronic device 101 having a structure in which the first housing structure 310 or the second housing structure 320 is folded about the folding axis B (e.g., the folding axis of the horizontal orientation) in the first folding direction (the vertical orientation).

According to various embodiments, if the electronic device is in the unfolded state, the first housing structure 310 and the second housing structure 320 may form one plane. In this case, as in FIG. 11A, the electronic device may display content 1100 on the display 330 forming one plane. As an example, if a gallery application program is executed, the display 330 may display an image list 1100. The image list 1100 may include thumbnails of images. If an option input of a thumbnail 1102 of a specific image in the image list 1100 is detected, the display 330 may display an image 1110 corresponding to the option input.

According to various embodiments, if the electronic device is in the intermediate state, the first housing structure 310 and the second housing structure 320 may form two planes folded about the folding axis at a certain angle (e.g., about 90 to 130 degrees). In this case, as in FIG. 11B, the electronic device may display content 1130 and content 1140, which are different from each other, on the first region of the display 330 disposed in the first housing structure 310 and the second region of the display 330 disposed in the second housing structure 320. As an example, if the gallery application program is executed, the display 330 may display an image list 1130 on the first region thereof, and a reference image 1140 acting as a reference in the image list 1120 on the second region thereof. As an example, the reference image may include an image at which a cursor is located or an image from which an option input is detected in the image list 1130.

According to an embodiment, if the angle formed by the first housing structure 310 and the second housing structure 320 is changed in the intermediate state, the electronic device may change a graphical user interface associated with the display 330 to correspond to a change in the angle formed by the first housing structure 310 and the second housing structure 320.

Figure 12:
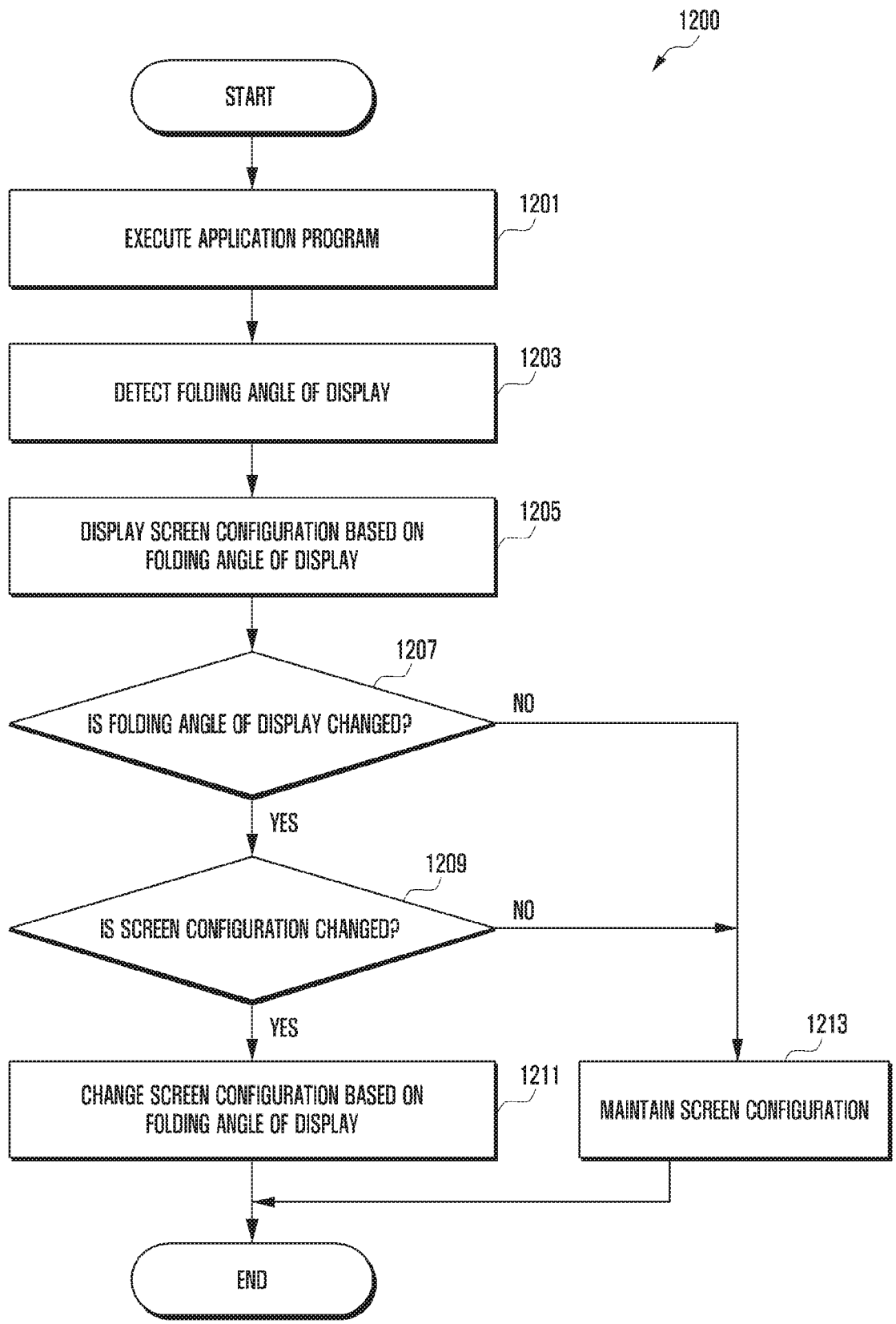
FIG. 12 is a flowchart illustrating an example operation of providing a user interface corresponding to the folding angle of the display in the electronic device according to various embodiments.

FIG. 12 is a flowchart 1200 illustrating an example operation of providing a user interface corresponding to the folding angle of the display in the electronic device according to various embodiments. In the following embodiments, processes may be performed in order, but are not necessarily performed in order. For example, the order of the processes may be changed, and at least two processes may be performed in parallel. Here, the electronic device may be the electronic device 101 of FIG. 1 or FIG. 4A.

Referring to FIG. 12, according to various embodiments, in operation 1201, the electronic device (e.g., the processor 120 of FIG. 1 or the processor 410 of FIG. 4A) may execute an application program. According to an embodiment, if the processor 120 detects a user input associated with at least one icon displayed on the display device 160, the processor 120 may execute an application program associated with the icon from which the user input is detected. As an example, the application program may be associated with web surfing, video playing, or music playing.

According to various embodiments, in operation 1203, the electronic device (e.g., the processor 120 or 410) may detect a folding angle of the display. According to an embodiment, as in processes 501, 503, 505 and 507 of FIG. 5, the processor 120 may identify the detected folding angle of the display based on at least one of the motion sensor or the magnetic force sensor.

According to various embodiments, in operation 1205, the electronic device (e.g., the processor 120 or 410) may configure a screen associated with an application program based on the folding angle of the display, and display content on the display device 160. According to an embodiment, if the electronic device 101 is in the unfolded state (e.g., the folding angle of the display is about 180 degrees), the display device 160 may display content 1000) (e.g., one page) on the display 230 disposed in the first housing structure 210 and the second housing structure 220 as in FIG. 10A.

According to various embodiments, in operation 1207, the electronic device (e.g., the processor 120 or 410) may determine whether the folding angle of the display is changed in a state in which the screen associated with the application program is displayed on the display device 160. According to an embodiment, as processes 501, 503, 505 and 507 of FIG. 5, the processor 120 may determine whether the folding angle of the display which is periodically detected using at least one of the motion sensor or the magnetic force sensor is changed. As an example, the period for detecting the folding angle of the display may be differently set based on an operation state of the electronic device 101. For example, the period for detecting the folding angle of the display may be set to be relatively long if the electronic device 101 is operated in a slip mode, and be set to be relatively short if the electronic device 101 is in an active state. The active state of the electronic device 101 may include a state in which the application program using the folding angle of the display is executed in the electronic device 101.

According to various embodiments, in operation 1209, the electronic device (e.g., the processor 120 or 410) may determine whether a configuration of the screen associated with the application program is changed based on a change in the folding angle of the display (e.g., YES of operation 1207). According to an embodiment, the processor 120 may determine whether the configuration of the screen associated with the application program displayed on the display device 160 is the same as the configuration of the screen associated with the application program detected based on the changed folding angle of the display.

According to various embodiments, in operation 1211, if the configuration of the screen associated with the application program is changed (e.g., YES of operation 1209), the electronic device (e.g., the processor 120 or 410) may configure the screen associated with the application program corresponding to the changed folding angle of the display, and display content on the display device 160. According to an embodiment, if the electronic device 101 is changed from the unfolded state to the intermediate state (e.g., the folding angle of the display is about 90 to 130 degrees), the display device 160 may display content 1010 and content 1020, which are different from each other (e.g., pages different from each other), on the first region of the display 230 disposed in the first housing structure 210 and the second region of the display 230 disposed in the second housing structure 220 as in FIG. 10B.

According to various embodiments, in operation 1213, if the configuration of the screen associated with the application program is not changed (e.g., NO of operation 1209) or if the folding angle of the display is not changed (e.g., NO of operation 1207), the electronic device (e.g., the processor 120 or 410) may maintain display the configuration of the screen associated with the application program displayed on the device 160.

According to various embodiments, an operating method of the electronic device may include: identifying a folded first angle between a first housing and a second housing and a first index associated with a state of the first angle based on a first motion sensor disposed in at least a part of the first housing connected to a hinge, and a second motion sensor disposed in at least a part of the second housing connected to the hinge, and is configured to be foldable about hinge relative to the first housing; identifying a folded second angle between the first housing and the second housing and a second index associated with a state of the second angle based on a magnetic force sensor disposed in the first housing; and determining the folded angle between the first housing and the second housing based on at least one of the first angle or the second angle selected based on the first index and the second index.

According to various example embodiments, the first angle may be generated based on angular velocity data and acceleration data, which correspond to the first housing and the second housing, and obtained by the first motion sensor and the second motion sensor.

According to various example embodiments, the first index may be generated based on at least one of gesture information of the electronic device, an orientation of the electronic device, or an angle of the electronic device.

According to various example embodiments, the second index may be generated based on at least one of intensity of a magnetic force measured by the magnetic force sensor, and a difference between the first angle and the second angle.

According to various example embodiments, the determining of the folded angle between the first housing and the second housing may include determining the folded angle between the first housing and the second housing based on the first angle based on the first index satisfying a designated first condition.

According to various example embodiments, the determining of the folded angle between the first housing and the second housing may include determining the folded angle between the first housing and the second housing based on the second angle based on the first index satisfying a designated second condition or based on the first index and the second index satisfying a designated third condition.

According to various example embodiments, the determining of the folded angle between the first housing and the second housing may include determining the folded angle between the first housing and the second housing based on the first angle and the second angle based on the first index and the second index satisfying a designated fourth condition.

According to various example embodiments, the determining of the folded angle between the first housing and the second housing may include determining the folded angle between the first housing and the second housing based on the second angle based on the second index satisfying a designated fifth condition.

According to various example embodiments, based on the first index satisfying the designated first condition, the operating method may further include updating angle estimation reference information of the magnetic force sensor based on the first angle.

According to various example embodiments, the electronic device detects the folding angle of the display using the motion sensor and the magnetic force sensor, and can thereby detect the folding angle corresponding to a folded state of the display.

According to various example embodiments, the electronic device updates reference information for angle detection of the magnetic force sensor module based on the folding angle of the display which is estimated by the motion sensor, and can thereby increase reliability of the folding angle of the display which is detected using the magnetic force sensor module.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
   a foldable housing including a hinge, a first housing connected to the hinge, and a second housing connected to the hinge and configured to be foldable about the hinge relative to the first housing;
   a first motion sensor disposed in at least a part of the first housing;
   a second motion sensor disposed in at least a part of the second housing;
   a magnetic force sensor disposed in at least a part of the first housing;
   a magnetic body disposed in at least a part of the second housing; and
   at least one processor operably connected to the first motion sensor, the second motion sensor, and the magnetic force sensor,
   wherein the at least one processor is configured to:
   identify a folded first angle between the first housing and the second housing based on the first motion sensor and the second motion sensor, and a first index associated with a state of the first angle,
   identify a folded second angle between the first housing and the second housing based on the magnetic force sensor, and a second index associated to a state of the second angle, and
   determine the folded angle between the first housing and the second housing based on at least one of the first angle or the second angle selected based on the first index and the second index.

2. The electronic device of claim 1, wherein the first motion sensor and/or the second motion sensor include a combination of at least two of an acceleration sensor, an angular velocity sensor, or a geomagnetic sensor.

3. The electronic device of claim 1, wherein the magnetic force sensor included in the first housing and the magnetic body included in the second housing adjoin the hinge, and are disposed to at least partly face each other in a folded state of the electronic device.

4. The electronic device of claim 1, wherein the processor is configured to generate the first index associated with the state of the first angle based on at least one of gesture information of the electronic device, and an orientation of the electronic device, or an angle of the electronic device.

5. The electronic device of claim 1, wherein the processor is configured to generate the second index associated with the state of the second angle based on at least one of intensity of a magnetic force measured by the magnetic force sensor or a difference between the first angle and the second angle.

6. The electronic device of claim 1, wherein, based on the first index satisfying a designated first condition, the processor is configured to determine the folded angle between the first housing and the second housing based on the first angle.

7. The electronic device of claim 1, wherein, based on the first index satisfying a designated second condition, the processor is configured to determine the folded angle between the first housing and the second housing based on the second angle.

8. The electronic device of claim 1, wherein, based on the first index and the second index satisfying a designated third condition, the processor is configured to determine the folded angle between the first housing and the second housing based on the second angle.

9. The electronic device of claim 1, wherein, based on the first index and the second index satisfying a designated fourth condition, the processor is configured to determine the folded angle between the first housing and the second housing based on the first angle and the second angle.

10. The electronic device of claim 1, wherein, based on the second index satisfying a designated fifth condition, the processor is configured to determine the folded angle between the first housing and the second housing based on the second angle.

11. The electronic device of claim 1, wherein, based on the first index satisfying the designated first condition, the processor is configured to update angle estimation reference information of the magnetic force sensor based on the first angle.

12. An operating method of an electronic device comprising:
   identifying a folded first angle between a first housing and a second housing based on a first motion sensor, and a first index associated with a state of the first angle, based on a first motion sensor disposed in at least a part of the first housing connected to a hinge, and a second motion sensor disposed in at least a part of the second housing configured to be foldable about the hinge relative to the first housing;
   identifying a folded second angle between the first housing and the second housing based on a magnetic force sensor disposed in the first housing, and a second index associated with a state of the second angle; and determining the folded angle between the first housing and the second housing based on at least one of the first angle or the second angle selected based on the first index and the second index.

13. The operating method of claim 12, wherein the first angle is generated based on angular velocity data and acceleration data corresponding to the first housing and the second housing, and obtained by the first motion sensor and the second motion sensor.

14. The operating method of claim 12, wherein the first index is generated based on at least one of gesture information of the electronic device, an orientation of the electronic device, or an angle of the electronic device.

15. The operating method of claim 12, wherein the second index is generated based on at least one of intensity of a magnetic force measured by the magnetic force sensor, and a difference between the first angle and the second angle.

16. The operating method of claim 12, wherein the determining of the folded angle between the first housing and the second housing includes determining the folded angle between the first housing and the second housing based on the first angle based on the first index satisfying a designated first condition.

17. The operating method of claim 12, wherein the determining of the folded angle between the first housing and the second housing includes determining the folded angle between the first housing and the second housing based on the second angle based on the first index satisfying a designated second condition or based on the first index and the second index satisfying a designated third condition.

18. The operating method of claim 12, wherein the determining of the folded angle between the first housing and the second housing includes determining the folded angle between the first housing and the second housing based on the first angle and the second angle based on the first index and the second index satisfying a designated fourth condition.

19. The operating method of claim 12, wherein the determining of the folded angle between the first housing and the second housing includes determining the folded angle between the first housing and the second housing based on the second angle based on the second index satisfying a designated fifth condition.

20. The operating method of claim 12, further comprising updating angle estimation reference information of the magnetic force sensor module based on the first angle based on the first index satisfying the designated first condition.

* * * * *